US011221087B2

(12) United States Patent
Ogasawara et al.

(10) Patent No.: US 11,221,087 B2
(45) Date of Patent: Jan. 11, 2022

(54) ELECTROMAGNETIC SWITCHING VALVE

(71) Applicant: MIKUNI CORPORATION, Tokyo (JP)

(72) Inventors: Toshiki Ogasawara, Iwate (JP); Masashi Ueda, Iwate (JP); Kazuya Yonemura, Iwate (JP); Hitoshi Takasaki, Iwate (JP); Ryosuke Dakiishi, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 17/030,393

(22) Filed: Sep. 24, 2020

(65) Prior Publication Data
US 2021/0131582 A1    May 6, 2021

(30) Foreign Application Priority Data
Nov. 5, 2019    (JP) .............................. JP2019-200832

(51) Int. Cl.
*F16K 11/07*    (2006.01)
*F16K 31/06*    (2006.01)

(52) U.S. Cl.
CPC ...... *F16K 31/0613* (2013.01); *F16K 11/0712* (2013.01); *F16K 11/0716* (2013.01); *F16K 31/0675* (2013.01)

(58) Field of Classification Search
CPC ............. F16K 31/0613; F16K 31/0675; F16K 31/0693; F16K 31/061; F16K 11/0712; F16K 11/0716; F01L 1/344
See application file for complete search history.

(56) References Cited

U.S. PATENT DOCUMENTS

| 2006/0016492 | A1* | 1/2006 | Muller | F16K 31/061 |
| | | | | 137/625.26 |
| 2009/0224192 | A1* | 9/2009 | Oikawa | F16K 11/0716 |
| | | | | 251/129.15 |
| 2013/0333773 | A1* | 12/2013 | Holmes | F16K 11/07 |
| | | | | 137/487.5 |
| 2014/0041742 | A1* | 2/2014 | Kondo | F16K 31/0603 |
| | | | | 137/625.67 |

(Continued)

FOREIGN PATENT DOCUMENTS

JP    2009063022    3/2009

*Primary Examiner* — Kelsey E Cary
(74) *Attorney, Agent, or Firm* — JCIPRNET

(57) ABSTRACT

An electromagnetic switching valve includes: a sleeve; a spool; an electromagnetic actuator, including a plunger having a through passage and a stator exerting a magnetomotive force on the plunger; and a transmission member of a tubular shape, interposed between the plunger and the spool and transmitting a driving force. The stator includes an insertion hole through which the transmission member is inserted. The transmission member includes: a facing wall facing the through passage; a first internal passage formed closer to the plunger than the facing wall and communicating with the through passage; a first opening formed closer to the plunger than the insertion hole and opening the first internal passage in a radial direction; second internal passages formed closer to the spool than the facing wall; and second openings formed closer to the spool than the insertion hole and opening the second internal passages in the radial direction.

14 Claims, 14 Drawing Sheets

(56) References Cited

U.S. PATENT DOCUMENTS

| | | | |
|---|---|---|---|
| 2015/0083257 A1* | 3/2015 | Shiota | F16K 1/44 |
| | | | 137/625.48 |
| 2018/0252330 A1* | 9/2018 | Zaiser | G05D 16/2024 |
| 2020/0063886 A1* | 2/2020 | Schneider | F16K 11/07 |

* cited by examiner

ELECTROMAGNETIC SWITCHING VALVE

CROSS-REFERENCE TO RELATED APPLICATION

This application claims the priority benefit of Japan Application No. 2019-200832, filed on Nov. 5, 2019. The entirety of the above-mentioned patent application is hereby incorporated by reference herein and made a part of this specification.

BACKGROUND

Technical Field

The disclosure relates to an electromagnetic switching valve that operates a spool by an electromagnetic actuator and switches an oil passage of hydraulic oil. In particular, the disclosure relates to an electromagnetic switching valve applied to a valve timing changing device, wherein the valve timing changing device changes opening and closing timing (valve timing) of an intake valve or an exhaust valve in an internal combustion engine mounted on a vehicle such as an automobile or a two-wheeler or the like.

Description of Related Art

As a conventional electromagnetic switching valve, there has been known an electromagnetic spool valve including: a spool valve, including a sleeve, a spool slidably disposed in the sleeve, and a return spring returning the spool to a rest position; an electromagnetic actuator, including a coil, a plunger and a stator; and a shaft of a tubular shape, interposed between the plunger and the spool and transmitting a driving force (for example, see Patent Document 1).

In this electromagnetic spool valve, a shaft breathing hole which communicates with a breathing passage of the plunger is provided on the shaft, and a breathing hole and an outer breathing groove which communicate with the shaft breathing hole are provided on the sleeve, and an oil discharge passage passing through the spool and an actuator breathing passage are independent, whereby the foreign matter can be prevented from entering the plunger side.

However, in this electromagnetic spool valve, the actuator breathing passage is also a region exposed to the hydraulic oil, and foreign matter in the hydraulic oil may be sucked into the shaft through the breathing hole of the sleeve and the breathing hole of the shaft. Then, the foreign matter sucked into the shaft easily reaches the back space of the plunger through the breathing passage of the plunger, and the plunger may be worn or locked by jamming of the foreign matter.

On the other hand, if the passage of the hydraulic oil communicating with the breathing passage of the plunger is made too narrow, the structure becomes similar to that of a dashpot, and the dampering action may occur, and the plunger may not operate normally.

RELATED ART

Patent Document

[Patent Document 1] Japanese Patent Laid-open No. 2009-63022

The disclosure has been made in view of the above circumstances, and an object thereof is to provide an electromagnetic switching valve aimed at simplifying the structure without increasing the number of components while the foreign matter can be suppressed or prevented from entering the plunger side of the electromagnetic actuator.

SUMMARY

An electromagnetic switching valve of the disclosure includes: a sleeve, defining a port communicating with an oil passage supplying or discharging hydraulic oil; a spool, reciprocally movably disposed on a predetermined axis direction in the sleeve, opening and closing the port; an electromagnetic actuator, including a plunger having a through passage which extends in the axis direction and a stator exerting a magnetomotive force on the plunger; and a transmission member of a tubular shape, interposed between the plunger and the spool and transmitting a driving force, wherein the stator includes an insertion hole through which the transmission member is inserted, and the transmission member includes: a facing wall facing the through passage of the plunger; a first internal passage formed closer to the plunger than the facing wall and communicating with the through passage; a first opening formed closer to the plunger than the insertion hole and opening the first internal passage in a radial direction; a second internal passage formed closer to the spool than the facing wall; and a second opening formed closer to the spool than the insertion hole and opening the second internal passage in the radial direction.

DESCRIPTION OF THE EMBODIMENTS

Figure 1:
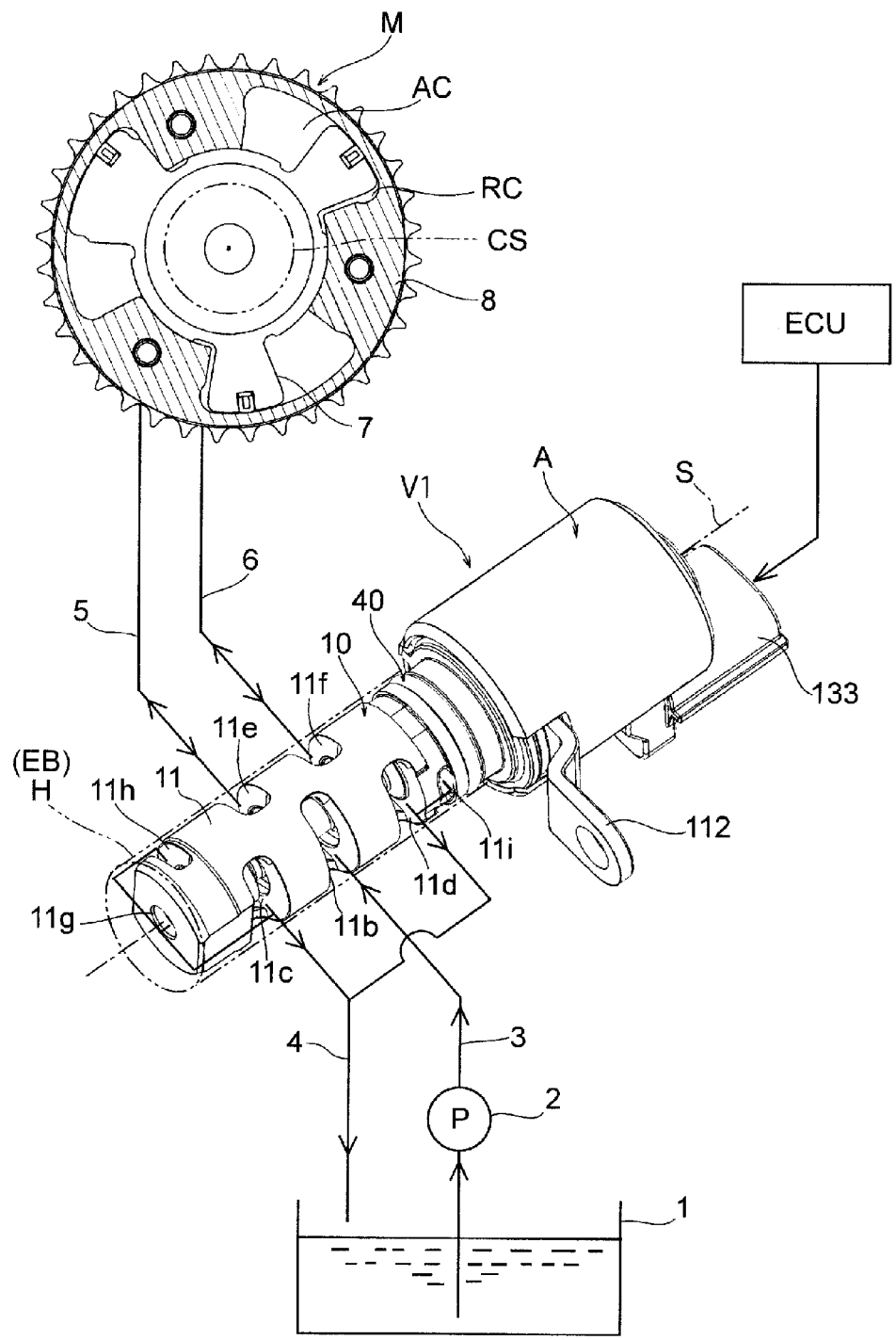
FIG. 1 is a configuration diagram of a case where an electromagnetic switching valve of the disclosure is applied to a valve timing changing device of an internal combustion engine.

Hereinafter, embodiments of the disclosure are described with reference to the accompanying drawings.

An electromagnetic switching valve V1 according to a first embodiment of the disclosure is applied to a valve timing changing device M of an internal combustion engine.

The electromagnetic switching valve V1 is appropriately driven and controlled by a control unit ECU according to an operation state of a vehicle and the internal combustion engine.

An engine body EB includes: a fitting hole H into which the electromagnetic switching valve V1 is fitted; a supply oil passage 3 through which hydraulic oil in an oil pan 1 is supplied via an oil pump 2; a discharge oil passage 4 through which the hydraulic oil is discharged from the electromagnetic switching valve V1 toward the oil pan 1; a first oil passage 5 communicating with one of a retard chamber RC and an advance chamber AC of the valve timing changing device M; and a second oil passage 6 communicating with the other of the retard chamber RC and the advance chamber AC of the valve timing changing device M.

The valve timing changing device M includes: a vane rotor 7 rotating integrally with a camshaft CS; and a housing rotor 8, housing the vane rotor 7 so that the vane rotor 7 is relatively rotatable in a predetermined angle range, and rotating in conjunction with a crankshaft.

The advance chamber AC and the retard chamber RC to and from which the hydraulic oil is supplied and discharged are defined by an internal space of the housing rotor 8 and the vane rotor 7.

Here, when the valve timing changing device M is applied to the camshaft CS on an intake side, the first oil passage 5 is connected to the advance chamber AC and the second oil passage 6 is connected to the retard chamber RC.

On the other hand, when the valve timing changing device M is applied to the camshaft CS on an exhaust side, the first oil passage 5 is connected to the retard chamber RC and the second oil passage 6 is connected to the advance chamber AC.

Figure 2:
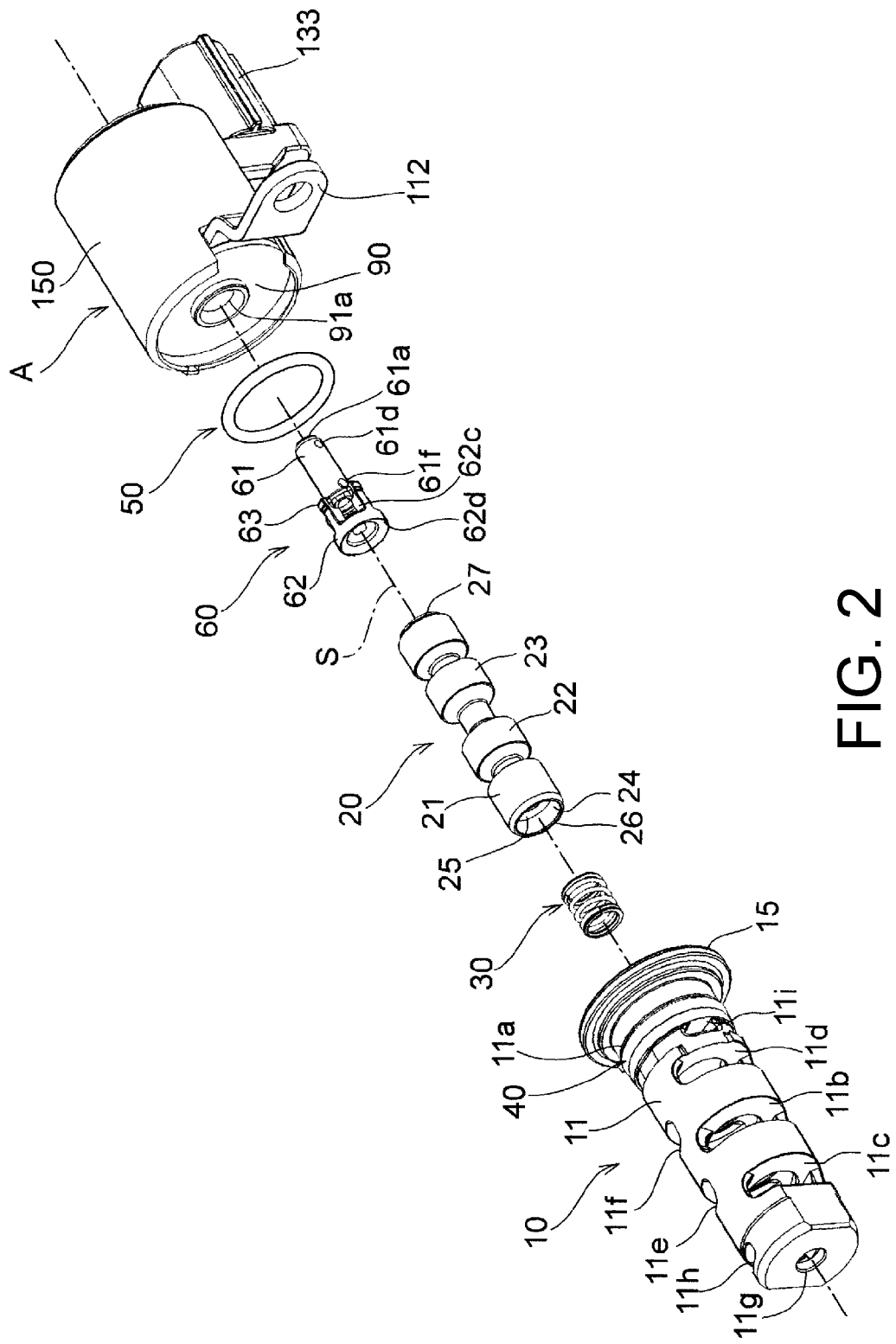
FIG. 2 is an exploded perspective view of an electromagnetic switching valve according to a first embodiment of the disclosure as viewed from a sleeve side.
Figure 3:
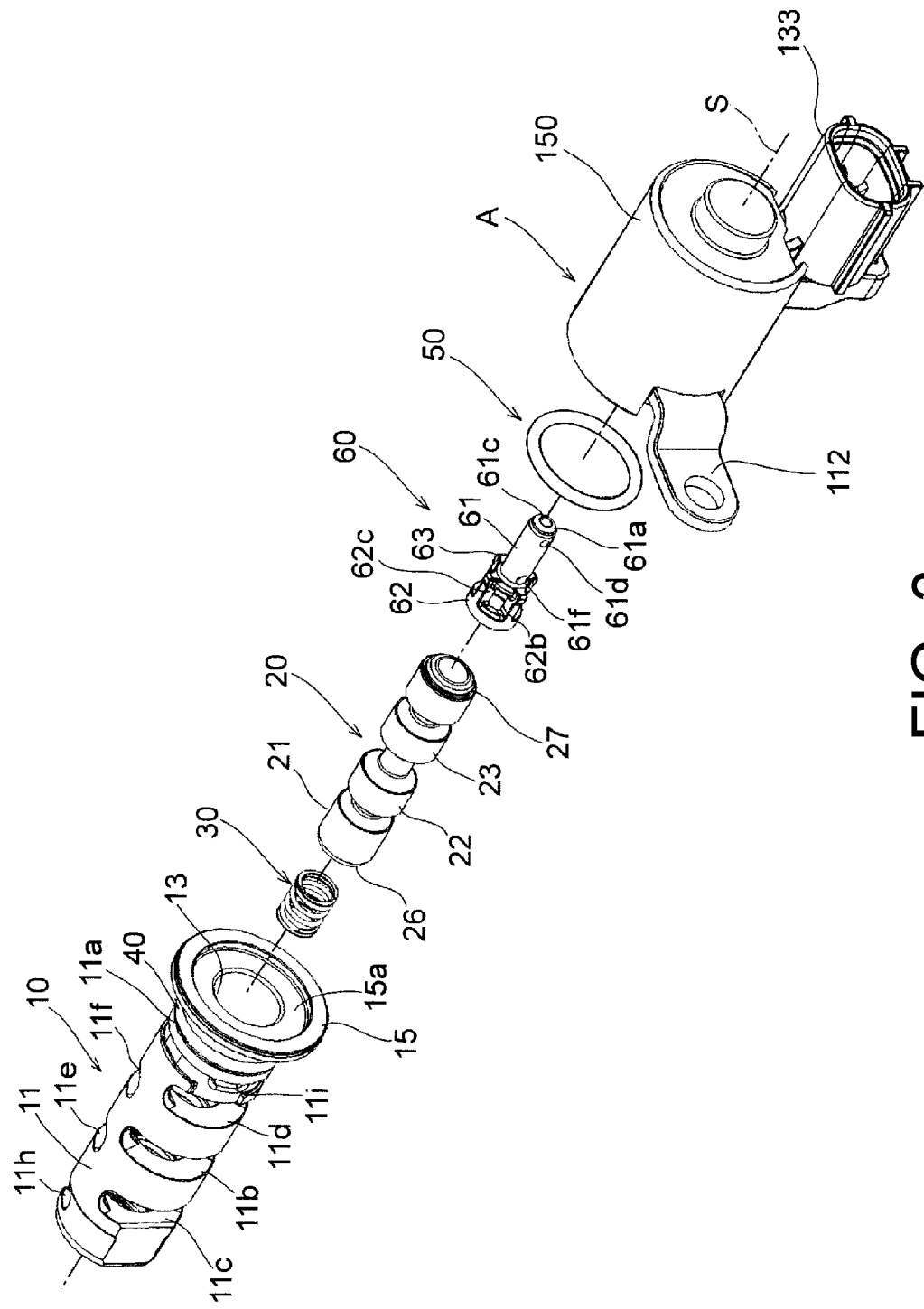
FIG. 3 is an exploded perspective view of an electromagnetic switching valve according to the first embodiment of the disclosure as viewed from an electromagnetic actuator side.

As shown in FIG. 2 and FIG. 3, the electromagnetic switching valve V1 includes a sleeve 10, a spool 20, an energizing spring 30, seal members 40 and 50, a transmission member 60, and an electromagnetic actuator A.

Figure 4:
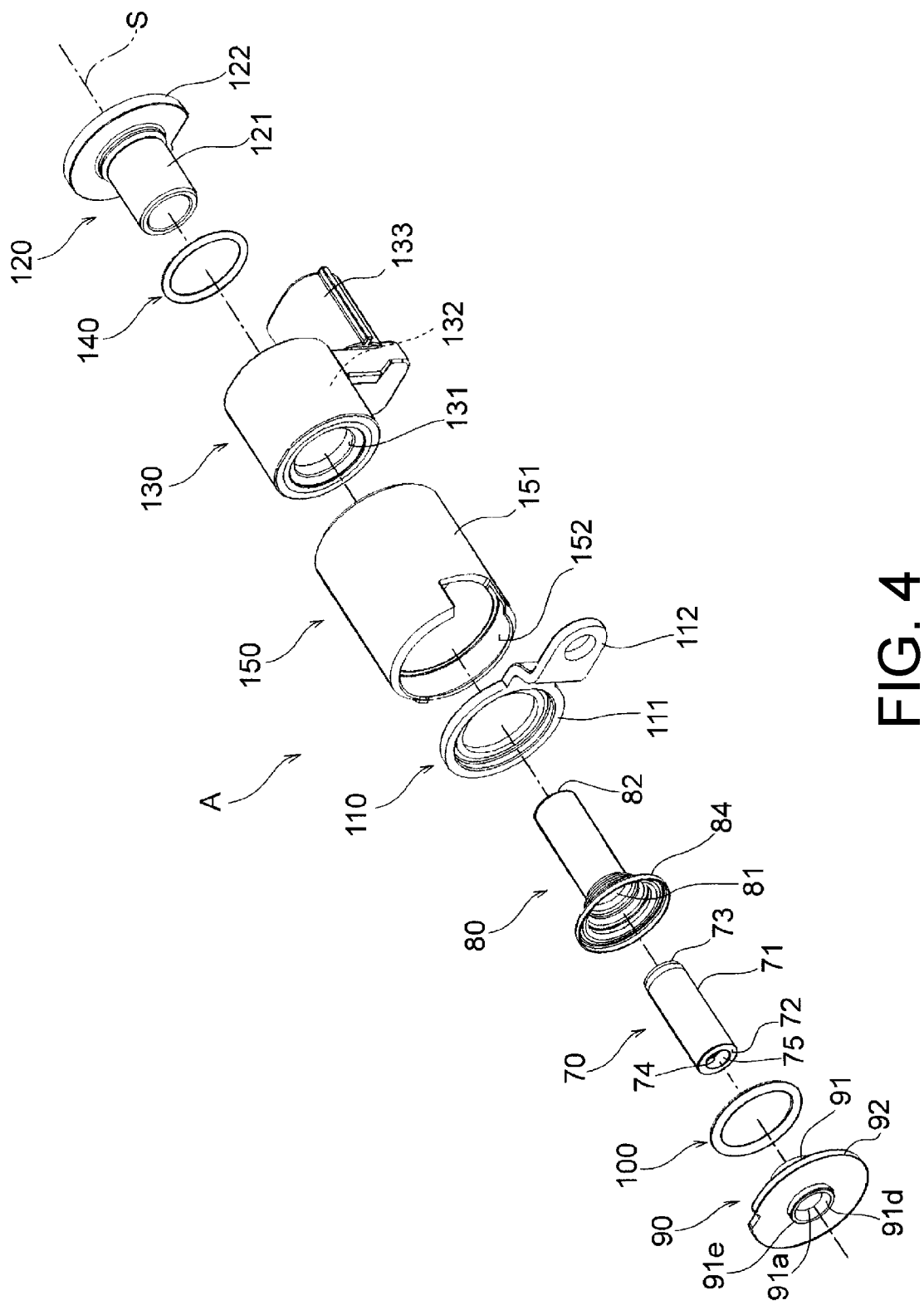
FIG. 4 is an exploded perspective view of an electromagnetic actuator included in the electromagnetic switching valve according to the first embodiment.
Figure 7:
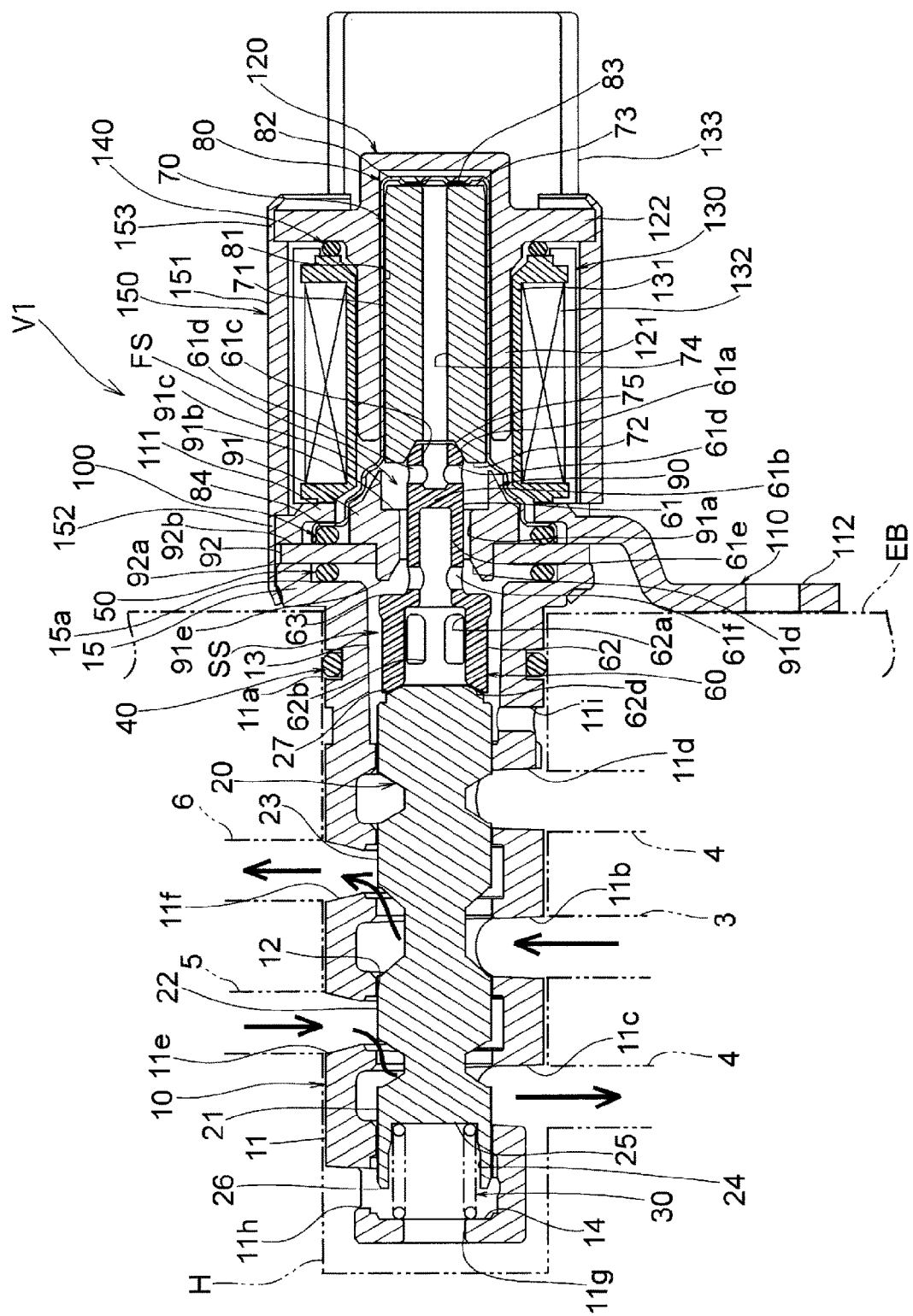
FIG. 7 is a cross-sectional view describing an operation of the electromagnetic switching valve according to the first embodiment, showing a state in which the spool and the plunger are located in a rest position.
Figure 8:
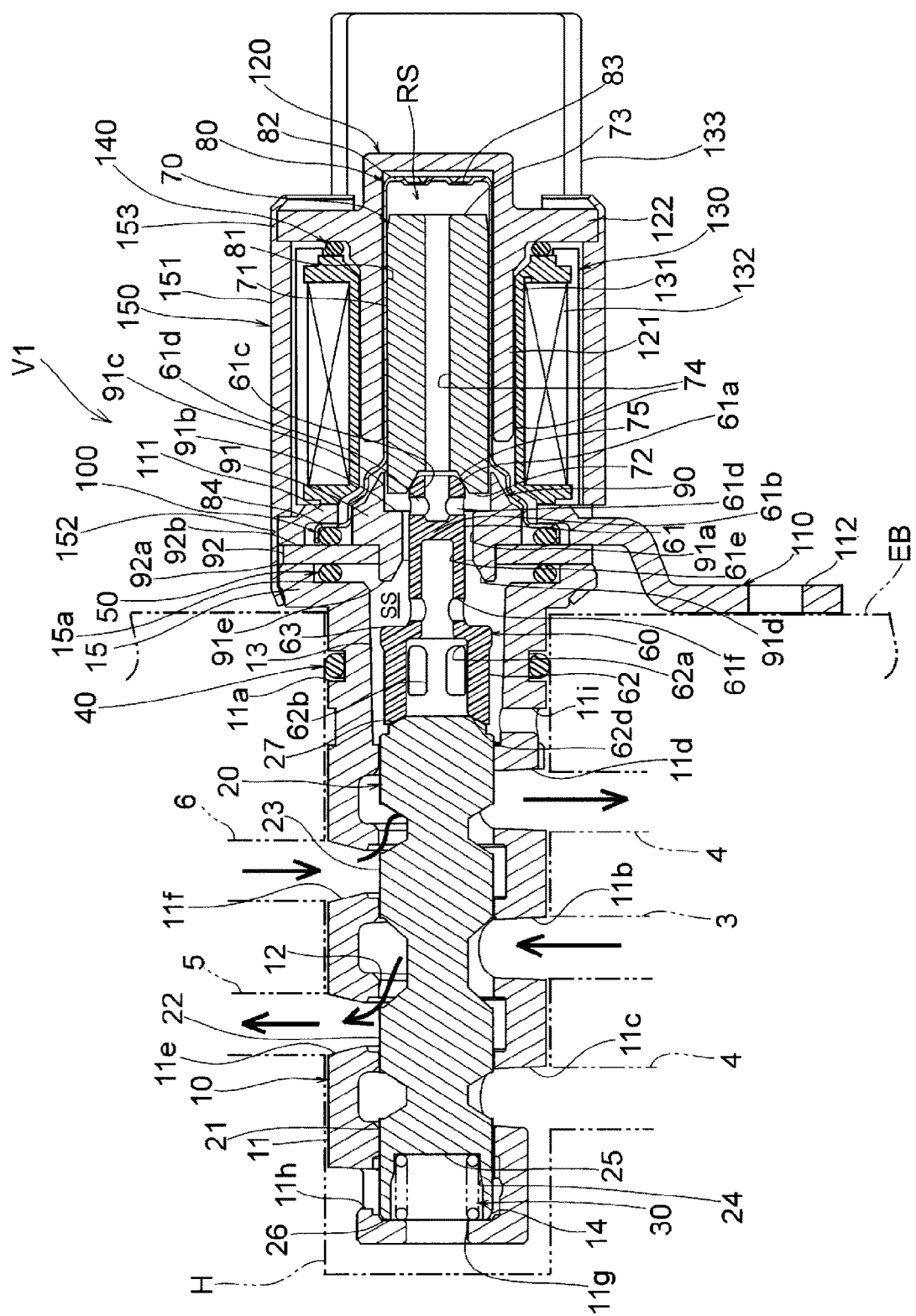
FIG. 8 is a cross-sectional view describing an operation of the electromagnetic switching valve according to the first embodiment, showing a state in which the spool and the plunger advance and are located in a maximum movement position.

As shown in FIG. 4, FIG. 7 and FIG. 8, the electromagnetic actuator A includes a plunger 70, a guide sleeve 80, a stator 90, a seal member 100, a bracket 110, an inner yoke 120, a mold unit 130, a seal member 140, and an outer yoke 150.

The sleeve 10 is formed of a metal material such as aluminum or the like into a cylindrical shape centered on an axis S, and includes, as shown in FIG. 2, FIG. 3 and FIG. 7, an outer peripheral surface 11, a seal groove 11a, a supply port 11b, discharge ports 11c and 11d, a first port 11e, a second port 11f, communication passages 11g, 11h and 11i, an inner peripheral surface 12, an inner peripheral surface 13, a receiving part 14, and a flange 15.

The outer peripheral surface 11 is formed as a cylindrical surface centered on the axis S, and is fitted in the fitting hole H of the engine body EB.

The seal groove 11a is formed as an annular groove on the outer peripheral surface 11 for the seal member 40 to be fitted therein.

The supply port 11b communicates with the supply oil passage 3. The discharge ports 11c and 11d communicate with the discharge oil passage 4. The first port 11e communicates with the first oil passage 5. The second port 11f communicates with the second oil passage 6.

The communication passage 11g is formed at an end of the sleeve 10 and provides communication between a space where the energizing spring 30 is disposed and the discharge oil passage 4.

The communication passage 11h opens in a radial direction near the end of the sleeve 10 and provides communication between the space where the energizing spring 30 is disposed and the discharge oil passage 4.

The communication passage 11i provides communication between an internal space SS where the transmission member 60 is disposed and the discharge oil passage 4 in a region of the inner peripheral surface 13 of the sleeve 10.

The inner peripheral surface 12 is formed as a cylindrical surface centered on the axis S, and makes close contact with and slidably guides the outer peripheral surface 21 of the spool 20.

The inner peripheral surface 13 is formed as a conical surface centered on the axis S, having a larger inner diameter than the inner peripheral surface 12 and widened at an end toward the flange 15, and is formed so that the internal space SS is secured around the transmission member 60 in the state in which the transmission member 60 is disposed.

The receiving part 14 serves to receive a first end 26 of the spool 20 and stop the spool 20 in a maximum advance position, and also serves to receive one end of the energizing spring 30.

The flange 15 is joined to the stator 90 with an end of the outer yoke 150 being crimped, and is connected and fixed to the electromagnetic actuator A. In addition, in the flange 15, an annular recess 15a is provided housing the seal member 50 so as to sandwich the seal member 50 in cooperation with the stator 90.

As shown in FIG. 2, FIG. 3 and FIG. 7, the spool 20 is formed so as to extend in the axis S direction, and includes the outer peripheral surface 21, a first valve 22, a second valve 23, a recess 24, a receiving part 25, the first end 26, and a second end 27.

To slide on the inner peripheral surface 12 of the sleeve 10, the outer peripheral surface 21 is formed in a cylindrical shape centered on the axis S, and has an outer diameter substantially the same as or slightly smaller than the inner diameter of the inner peripheral surface 12.

The first valve 22 is formed so as to define the outer peripheral surface 21 that is wider than an opening width of the first port 11e in the axis S direction, and opens and closes the first port 11e of the sleeve 10 by moving in the axis S direction.

The second valve 23 is formed so as to define the outer peripheral surface 21 that is wider than an opening width of the second port 11*f* in the axis S direction, and opens and closes the second port 11*f* of the sleeve 10 by moving in the axis S direction.

The recess 24 is formed on the first end 26 side so as to house the energizing spring 30 in an extensible and compressible manner. The receiving part 25 is formed as a bottom wall of the recess 24 to receive the other end of the energizing spring 30 housed in the recess 24.

The first end 26 is formed as an annular end surface and releasably abuts against the receiving part 14 of the sleeve 10.

The second end 27 is formed as an annular and convex curved surface centered on the axis S to abut against an annular abutting part 62*d* of the transmission member 60 in the axis S direction.

The energizing spring 30 is a compression type coil spring, and is assembled so that one end thereof abuts against the receiving part 14 of the sleeve 10 and the other end abuts against the receiving part 25 of the spool 20.

When the energizing spring 30 is in a rest state, as shown in FIG. 7, the energizing spring 30 exerts an energizing force causing the plunger 70 to retreat to a rest position and stopping the spool 20 in a position where the first valve 22 cuts off communication between the first port 11*e* and the supply port 11*b* and communicates the first port 11*e* with the discharge port 11*c*, and where the second valve 23 communicates the second port 11*f* with the supply port 11*b* and cuts off communication between the second port 11*f* and the discharge port 11*d*.

The seal member 40 is an O-ring made of rubber, fitted into the seal groove 11*a* of the sleeve 10 and sealing a space between the engine body EB and the sleeve 10.

The seal member 50 is an O-ring made of rubber, disposed in the annular recess 15*a* of the flange 15 of the sleeve 10 and sealing a space between the sleeve 10 and the stator 90.

Figure 5:
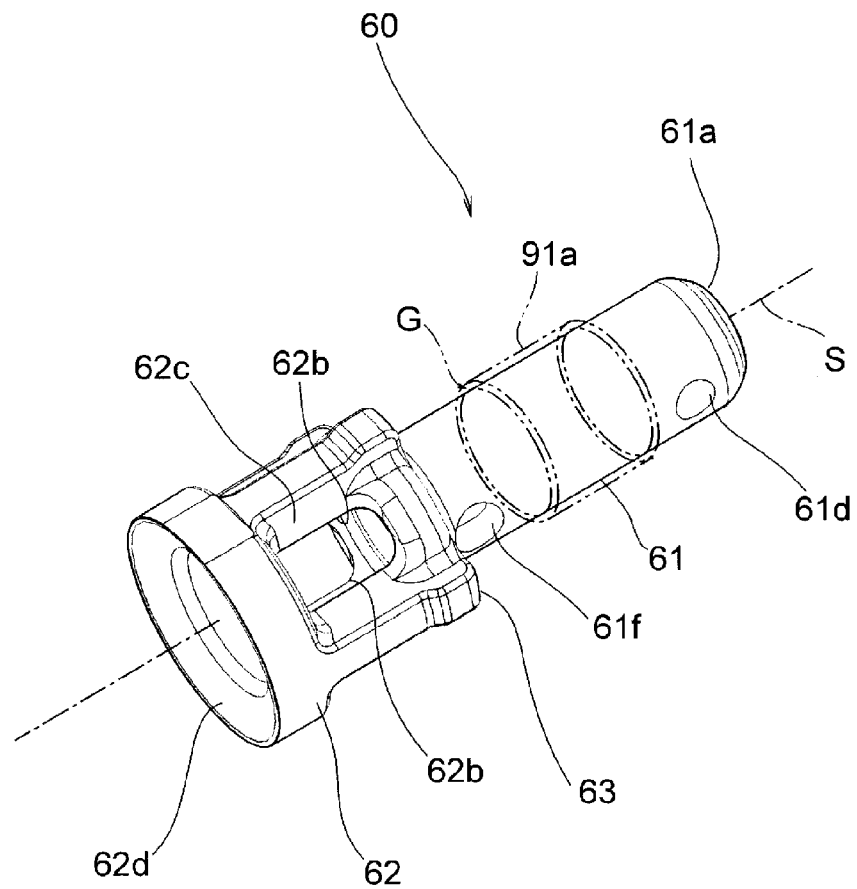
FIG. 5 is an external perspective view showing a transmission member included in the electromagnetic switching valve according to the first embodiment.
Figure 6:
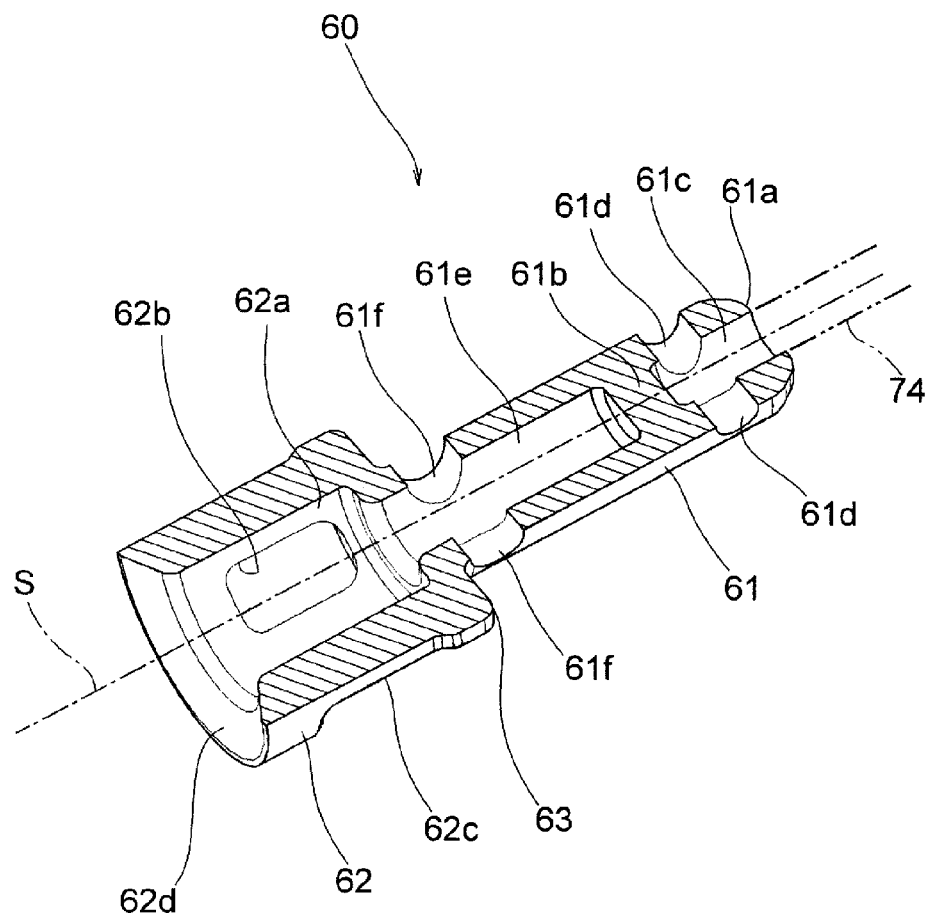
FIG. 6 is a perspective cross-sectional view of the transmission member shown in FIG. 5 cut along a plane passing through an axis line.

The transmission member 60 is formed of a resin material into a tubular shape extending in the axis S direction to be interposed between the plunger 70 and the spool 20 and transmit the driving force. As shown in FIG. 5 to FIG. 7, the transmission member 60 includes a small-diameter tubular part 61 inserted through an insertion hole 91*a* of the stator 90, a large-diameter tubular part 62 disposed in the region of the inner peripheral surface 13 inside the sleeve 10, and an annular stepped part 63.

The small-diameter tubular part 61 includes an end 61*a*, a facing wall 61*b*, a first internal passage 61*c*, two first openings 61*d*, a second internal passage 61*e*, and two second openings 61*f*.

The end 61*a* is formed as an annular and convex curved surface centered on the axis S, and abuts against a receiving recess 75 of the plunger 70.

The facing wall 61*b* is formed as a cutoff wall facing a through passage 74 of the plunger 70 in the axis S direction.

The first internal passage 61*c* is formed closer to the plunger 70 than the facing wall 61*b* in the axis S direction and forms a cylindrical hole extending in the axis S direction to communicate with the through passage 74 of the plunger 70.

The passage area of the first internal passage 61*c* is formed equal to or larger than the passage area of the through passage 74. Here, the passage area of the first internal passage 61*c* is the passage area of the first internal passage 61*c* in a cross section perpendicular to the axis S; the passage area of the through passage 74 is the passage area of the through passage 74 in a cross section perpendicular to the axis S.

As shown in FIG. 7 and FIG. 8, the first opening 61*d* is formed closer to the plunger 70 than the insertion hole 91*a* of the stator 90 in the axis S direction and forms a circular hole that opens the first internal passage 61*c* in the radial direction.

The passage area of the first opening 61*d* is formed equal to or larger than the passage area of the first internal passage 61*c*. Here, the passage area of the first opening 61*d* is the passage area of the two first openings 61*d* that form circular holes.

The second internal passage 61*e* is formed closer to the spool 20 than the facing wall 61*b* in the axis S direction and forms a cylindrical hole extending in the axis S direction.

An inner diameter (passage area) of the second internal passage 61*e* is formed larger than an inner diameter (passage area) of the first internal passage 61*c*.

As shown in FIG. 7 and FIG. 8, the second opening 61*f* is formed closer to the spool 20 than the insertion hole 91*a* of the stator 90 in the axis S direction and forms a circular hole that opens the second internal passage 61*e* in the radial direction.

The passage area of the second opening 61*f* is formed equal to or larger than the passage area of the second internal passage 61*e*. Here, the passage area of the second opening 61*f* is the passage area of the two second openings 61*f* that form circular holes; the passage area of the second internal passage 61*e* is the passage area of the second internal passage 61*e* in a cross section perpendicular to the axis S.

The large-diameter tubular part 62 includes a second internal passage 62*a*, four third openings 62*b*, four lightening parts 62*c* formed around the third openings 62*b*, and the annular abutting part 62*d*.

To communicate with the second internal passage 61*e*, the second internal passage 62*a* is formed closer to the spool 20 than the facing wall 61*b* in the axis S direction and forms a cylindrical hole extending in the axis S direction.

An inner diameter (passage area) of the second internal passage 62*a* is formed larger than the inner diameter (passage area) of the second internal passage 61*e*.

As shown in FIG. 7 and FIG. 8, the third opening 62*b* is formed closer to the spool 20 than the insertion hole 91*a* of the stator 90 in the axis S direction and forms a substantially rectangular hole that opens the second internal passage 62*a* in the radial direction.

The passage area of the third opening 62*b* is formed equal to or larger than the passage area of the second internal passage 62*a*. Here, the passage area of the third opening 62*b* is the passage area of the four third openings 62*b* that form substantially rectangular holes; the passage area of the second internal passage 62*a* is the passage area of the second internal passage 62*a* in a cross section perpendicular to the axis S.

The lightening parts 62*c* are formed so that a region around each of the third openings 62*b* is recessed radially inward from the outer peripheral surface of the large-diameter tubular part 62. According to this, when the transmission member 60 is disposed in the sleeve 10, a sufficient gap space that allows the flow of the hydraulic oil can be secured between the transmission member 60 and the inner peripheral surface 13.

The annular abutting part 62*d* is formed as an annular and concave tapered surface centered on the axis S, to define an opening that opens the second internal passage 62*a* toward the spool 20 and to abut against the second end 27 of the spool 20.

The annular stepped part 63 is formed at a boundary between the small-diameter tubular part 61 and the large-diameter tubular part 62, and faces an annular facing part 91e of the stator 90 in the axis S direction.

In the above configuration, the second opening 61f and the third opening 62b are disposed separated from each other in the axis S direction. That is, the transmission member 60 is formed with the second opening 61f and the third opening 62b separated from each other in the axis S direction.

The plunger 70 is formed of a ferromagnetic material such as iron or the like into a columnar shape extending in the axis S direction, and includes, as shown in FIG. 4 and FIG. 7, an outer peripheral surface 71, a first end 72, a second end 73, a through passage 74, and a receiving recess 75.

The outer peripheral surface 71 is slidably guided in the axis S direction by an inner wall surface 81 of the guide sleeve 80.

The first end 72 forms an annular flat surface perpendicular to the axis S.

The second end 73 forms an annular flat surface perpendicular to the axis S, and abuts against a stopper 83 of the guide sleeve 80 in the rest position.

The through passage 74 forms a cylindrical hole that is disposed on the axis S, extends in the axis S direction and penetrates from the first end 72 to the second end 73.

Around the through passage 74 of the first end 72, the receiving recess 75 is formed as an annular and concave tapered surface centered on the axis S, to receive and abut against the end 61a of the transmission member 60.

The guide sleeve 80 is formed by deep drawing a sheet metal material into a bottomed cylindrical shape centered on the axis S, and includes, as shown in FIG. 4 and FIG. 7, the inner wall surface 81, a bottom wall surface 82, the stopper 83 protruding from the bottom wall surface 82, and a flange 84.

The inner wall surface 81 slidably guides the plunger 70 in the axis S direction.

The stopper 83 is formed protruding inward from the bottom wall surface 82 in the axis S direction, and serves to define the rest position of the plunger 70.

In this way, since the stopper 83 is formed protruding inward, in a state in which the plunger 70 is abutting against the stopper 83, a gap space is defined between the second end 73 of the plunger 70 and the bottom wall surface 82. Accordingly, it can be prevented that the plunger 70 adheres to the bottom wall surface 82 of the guide sleeve 80 and becomes inoperable.

The flange 84 includes a region formed in a multistep conical shape so as to cover the transmission member 60 from the outside in the radial direction, and is sandwiched and fixed between the stator 90 and the bracket 110 together with the seal member 100.

Figure 9:
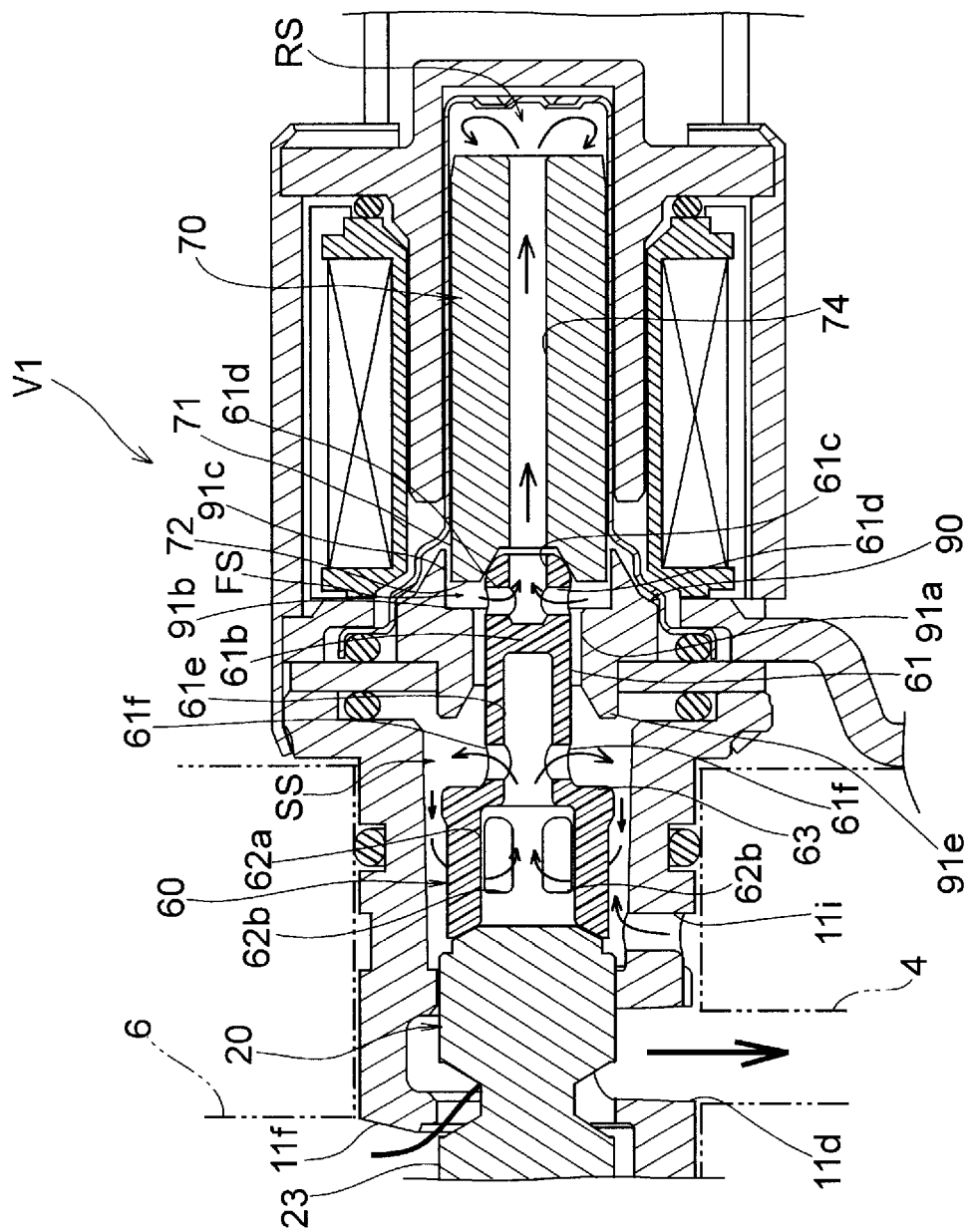
FIG. 9 is a cross-sectional view showing a flow state of the hydraulic oil around the plunger and the transmission member when the plunger advances in the electromagnetic switching valve according to the first embodiment.

In a relationship between the guide sleeve 80 and the plunger 70 described above, when the plunger 70 is located in an advance position in a direction of compressing the energizing spring 30, as shown in FIG. 8 and FIG. 9, by the inner wall surface 81 and the bottom wall surface 82 of the guide sleeve 80 and the second end 73 of the plunger 70, a retreat movement space RS is defined allowing the plunger 70 to retreat to the rest position.

To form a part of a magnetic path and exert a magnetomotive force on the plunger 70 by energizing the coil 132, the stator 90 is formed of a ferromagnetic material, and a front yoke 91 having a multistep columnar shape and an end yoke 92 having a substantially disc shape are integrally fixed thereto by crimping.

As shown in FIG. 4 and FIG. 7, the stator 90 includes the insertion hole 91a, an annular facing surface 91b, an annular inner wall surface 91c, a guide part 91d, an annular facing part 91e, and joint surfaces 92a and 92b.

The insertion hole 91a forms a cylindrical hole centered on the axis S for the small-diameter tubular part 61 of the transmission member 60 to be inserted therethrough with a predetermined gap G therebetween.

Here, the passage area of the gap G defined around the transmission member 60 in the insertion hole 91a is formed equal to or smaller than the passage area of the first opening 61d. The passage area of the gap G is the passage area of the gap G having an annular shape in a cross section perpendicular to the axis S.

Moreover, the gap G is preferably as small as possible in a range in which viscous resistance of the hydraulic oil does not increase. The annular facing surface 91b forms an annular flat surface to face the first end 72 of the plunger 70 in the axis S direction.

To face the outer peripheral surface 71 of the plunger 70 with a predetermined gap therebetween in the radial direction in a state in which the plunger 70 has advanced, the annular inner wall surface 91c forms a substantially cylindrical surface centered on the axis S.

The guide part 91d is formed as an annular and concave tapered surface centered on the axis S, and serves to guide the end 61a of the transmission member 60 onto the axis S when the transmission member 60 is inserted into the insertion hole 91a of the stator 90.

The annular facing part 91e has an annular shape centered on the axis S to face the annular stepped part 63 of the transmission member 60 in the axis S direction.

In an assembled state, the joint surfaces 92a and 92b form flat surfaces to make close contact with the seal members 50 and 100 and to be sandwiched and fixed by the flange 15 of the sleeve 10 and the bracket 110.

Figure 10:
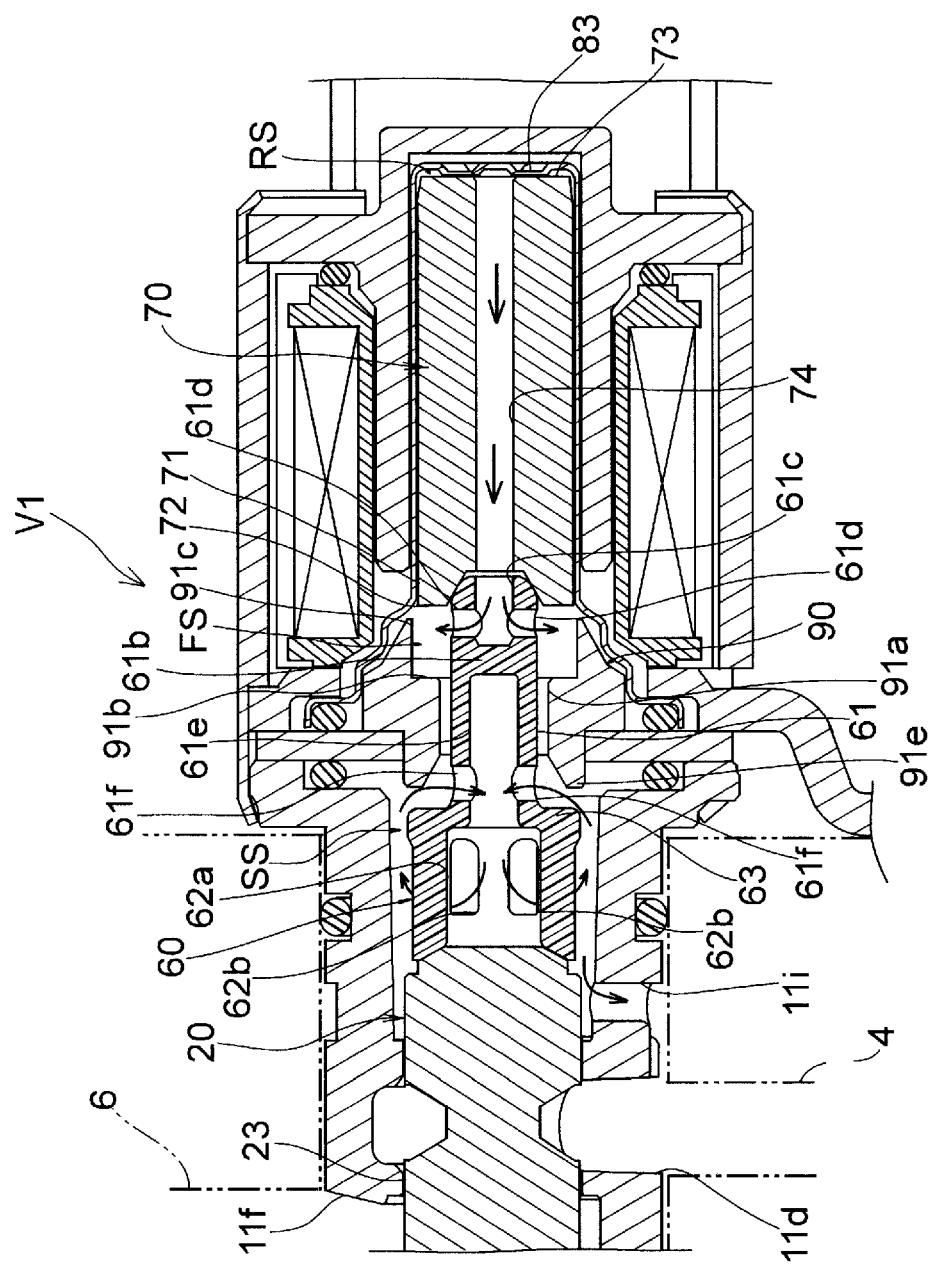
FIG. 10 is a cross-sectional view showing a flow state of the hydraulic oil around the plunger and the transmission member when the plunger retreats in the electromagnetic switching valve according to the first embodiment.

In a relationship between the stator 90 and the plunger 70 described above, when the plunger 70 is in the rest position, as shown in FIG. 7 and FIG. 10, by the annular facing surface 91b and the annular inner wall surface 91c of the stator 90 and the first end 72 of the plunger 70, an advance movement space FS is defined allowing the plunger 70 to advance in the direction of compressing the energizing spring 30.

The seal member 100 is an O-ring made of rubber, disposed between the joint surface 92b of the stator 90 and the flange 84 of the guide sleeve 80, and sealing a joint region of the stator 90 and the guide sleeve 80.

The bracket 110 is formed of a metal material and includes an annular part 111 and an attachment part 112.

The annular part 111 is sandwiched between the mold unit 130 and the stator 90 (end yoke 92), and is also fitted and fixed in a fitting recess 152 of the outer yoke 150.

The attachment part 112 extends outside the outer yoke 150 and is fixed to the engine body EB by a screw or the like.

The inner yoke 120 forms a part of a magnetic path, is formed of a ferromagnetic material into a bottomed cylindrical shape with collar, and includes, as shown in FIG. 4 and FIG. 7, a cylindrical part 121 and a collar 122.

The cylindrical part 121 is formed so that the guide sleeve 80 is fitted inside thereof and the bobbin 131 of the mold unit 130 is fitted outside thereof.

The collar 122 is fitted into a fitting recess 153 of the outer yoke 150 and fixed by crimping.

As shown in FIG. 4 and FIG. 7, the mold unit 130 includes the bobbin 131 made of resin fitted into the cylindrical part 121 of the inner yoke 120, a coil 132 for excitation wound around the bobbin 131, and a connector 133 integrally formed with a cylindrical part covering around the coil 132 and surrounding a terminal.

The seal member 140 is an O-ring made of rubber, disposed between the collar 122 of the inner yoke 120 and the bobbin 131 of the mold unit 130 and sealing a space between the bobbin 131 and the inner yoke 120.

The outer yoke 150 forms a part of a magnetic path, is formed of a ferromagnetic material into a cylindrical shape, and includes, as shown in FIG. 4 and FIG. 7, a cylindrical part 151, the fitting recess 152 and the fitting recess 153.

The cylindrical part 151 is formed in a cylindrical shape centered on the axis S, and is formed to cover from the outside in the radial direction, a region of the mold unit 130 wound by the coil 132, the collar 122 of the inner yoke 120, the annular part 111 of the bracket 110, the stator 90 (end yoke 92), and the flange 15 of the sleeve 10.

In a state in which the annular part 111 of the bracket 110, the stator 90 (end yoke 92), and the flange 15 of the sleeve 10 are fitted into the fitting recess 152 in the axis S direction, by crimping a tip region of the fitting recess 152, the annular part 111, the stator 90 (end yoke 92) and the flange 15 are fixed.

In a state in which the collar 122 of the inner yoke 120 is fitted into the fitting recess 153, by crimping a tip region of the fitting recess 153, the collar 122 is fixed.

Next, a switching operation of the electromagnetic switching valve V1 is described.

First, in a non-energized state of the coil 132, by the energizing force of the energizing spring 30 via the spool 20 and the transmission member 60, the plunger 70 stops in the rest position where the second end 73 abuts against the stopper 83, as shown in FIG. 7.

In addition, the spool 20 stops in a retreat position corresponding to the rest position of the plunger 70 via the transmission member 60.

In this retreat position, the first valve 22 of the spool 20 is in a state of closing an oil passage between the first port 11e and the supply port 11b and opening an oil passage between the first port 11e and the discharge port 11c.

In addition, the second valve 23 of the spool 20 is in a state of opening an oil passage between the second port 11f and the supply port 11b and closing an oil passage between the second port 11f and the discharge port 11d.

At this time, the hydraulic oil is discharged through the first oil passage 5 and supplied through the second oil passage 6.

Subsequently, when the coil 132 is appropriately energized and the magnetomotive force is generated, the plunger 70 advances while resisting the energizing force of the energizing spring 30. As shown in FIG. 8, the first end 26 of the spool 20 abuts against the receiving part 14, and the spool 20 is positioned in the maximum advance position.

In this maximum advance position, the first valve 22 of the spool 20 is in a state of opening the oil passage between the first port 11e and the supply port 11b and closing the oil passage between the first port 11e and the discharge port 11c.

In addition, the second valve 23 of the spool 20 is in a state of closing the oil passage between the second port 11f and the supply port 11b and opening the oil passage between the second port 11f and the discharge port 11d.

At this time, the hydraulic oil is supplied through the first oil passage 5 and discharged through the second oil passage 6.

Moreover, the energization of the coil 132 can be appropriately controlled and the spool 20 can be stopped in an intermediate position.

In this intermediate position, the first valve 22 of the spool 20 is in a state of closing the oil passage between the first port 11e and the supply port 11b and closing the oil passage between the first port 11e and the discharge port 11c.

In addition, the second valve 23 of the spool 20 is in a state of closing the oil passage between the second port 11f and the supply port 11b and closing the oil passage between the second port 11f and the discharge port 11d.

At this time, the supply and discharge of hydraulic oil are cut off in both the first oil passage 5 and the second oil passage 6.

When the electromagnetic switching valve V1 performing the above switching operation is applied to, for example, the valve timing changing device M of the camshaft CS on the intake side of the internal combustion engine, the first oil passage 5 is connected to the advance chamber AC and the second oil passage 6 is connected to the retard chamber RC.

Therefore, when the plunger 70 is in the rest position, a valve timing of an intake valve is held in a retard position, and by advancing the plunger 70 according to an operation condition, the valve timing of the intake valve is positioned in an advance position.

On the other hand, when the electromagnetic switching valve V1 performing the above switching operation is applied to, for example, the valve timing changing device M of the camshaft CS on the exhaust side of the internal combustion engine, the first oil passage 5 is connected to the retard chamber RC and the second oil passage 6 is connected to the advance chamber AC.

Therefore, when the plunger 70 is in the rest position, a valve timing of an exhaust valve is held in the advance position, and by advancing the plunger 70 according to an operation condition, the valve timing of the exhaust valve is positioned in the retard position.

Next, the flow of the hydraulic oil around the plunger 70 and the transmission member 60 in the electromagnetic switching valve V1 performing the above switching operation is described.

When the plunger 70 advances from the rest position, as shown in FIG. 9, the hydraulic oil in the advance movement space FS passes through the through passage 74 of the plunger 70 via the first opening 61d and the first internal passage 61c of the transmission member 60, and flows into the retreat movement space RS defined behind the plunger 70, as shown by arrows. Accordingly, the plunger 70 is able to smoothly advance.

Here, since the passage area of the first internal passage 61c is formed equal to or larger than the passage area of the through passage 74, and the passage area of the first opening 61d is formed equal to or larger than the passage area of the first internal passage 61c, when the hydraulic oil moves from the advance movement space FS to the retreat movement space RS, a dampering effect or the like caused by throttling resistance can be prevented from occurring and the plunger 70 can be smoothly operated.

Further, as the plunger 70 advances, the outer peripheral surface 71 of the plunger 70 faces the annular inner wall surface 91c of the stator 90 in the radial direction with a small gap, and the first end 72 of the plunger 70 faces the annular facing surface 91b of the stator 90 in the axis S direction. Therefore, the hydraulic oil in the advance movement space FS surrounded by the first end 72 and the annular facing surface 91b is actively directed to the first opening 61d and the first internal passage 61c, and the flow of the hydraulic oil from the advance movement space FS to the retreat movement space RS is facilitated.

On the other hand, in the internal space SS of the sleeve 10, the transmission member 60 is pushed by the plunger 70 and advances together with the spool 20.

Here, the passage area of the gap G defined around the small-diameter tubular part 61 of the transmission member 60 in the insertion hole 91a of the stator 90 is equal to or smaller than the passage area of the first opening 61d, that is, the passage area of the gap G is formed as small as possible within the range in which the viscous resistance does not increase. Therefore, it becomes difficult for the hydraulic oil (in particular foreign matter) in the internal space SS to flow into the advance movement space FS through the insertion hole 91a.

In this state, in the hydraulic oil in the internal space SS, because the annular stepped part 63 and the annular facing part 91e are separated by an increasing distance, for example, as shown by the arrows in FIG. 9, the hydraulic oil in the second internal passage 61e of the transmission member 60 flows from the second opening 61f into the internal space SS, and the hydraulic oil in the internal space SS outside the transmission member 60 flows from the third opening 62b into the second internal passages 62a and 61e, or the hydraulic oil in the vicinity of the discharge port 11d and the discharge oil passage 4 flows into the internal space SS through the communication passage 11i. In this way, the hydraulic oil in the internal space SS circulates around the transmission member 60 on the whole.

When the plunger 70 retreats toward the rest position from the advance position, as shown by arrows in FIG. 10, the hydraulic oil in the retreat movement space RS passes through the first passage 61c and the first opening 61d of the transmission member 60 via the through passage 74 of the plunger 70, and flows into the advance movement space FS defined on a front side of the plunger 70. Accordingly, the plunger 70 is able to smoothly retreat.

Here, as described above, since the passage area of the first internal passage 61c is formed equal to or larger than the passage area of the through passage 74, and the passage area of the first opening 61d is formed equal to or larger than the passage area of the first internal passage 61c, when the hydraulic oil moves from the retreat movement space RS to the advance movement space FS, a dampering effect or the like caused by throttling resistance can be prevented from occurring and the plunger 70 can be smoothly operated.

On the other hand, in the internal space SS of the sleeve 10, due to the energizing force of the energizing spring 30, the transmission member 60 retreats together with the spool 20, following the plunger 70.

Here, similarly to the above, the passage area of the gap G defined around the small-diameter tubular part 61 of the transmission member 60 in the insertion hole 91a of the stator 90 is equal to or smaller than the passage area of the first opening 61d, that is, the passage area of the gap G is formed as small as possible within the range in which the viscous resistance does not increase. Therefore, it becomes difficult for the hydraulic oil (in particular foreign matter) in the internal space SS to flow into the advance movement space FS through the insertion hole 91a.

In this state, in the hydraulic oil in the internal space SS, because the annular stepped part 63 and the annular facing part 91e are separated by a decreasing distance, for example, as shown by the arrows in FIG. 10, the hydraulic oil in the internal space SS outside the transmission member 60 flows from the second opening 61f of the transmission member 60 into the second internal passage 61e, and the hydraulic oil in the second internal passages 62a and 61e inside the transmission member 60 flows from the third opening 62b into the internal space SS outside the transmission member 60, or the hydraulic oil in the internal space SS flows out to the discharge port 11d and the discharge oil passage 4 through the communication passage 11i. In this way, the hydraulic oil in the internal space SS circulates around the transmission member 60 on the whole.

Here, the second opening 61f and the third opening 62b are formed separated from each other in the axis S direction, and the passage area of the second opening 61f is formed equal to or larger than the passage area of the second internal passage 61e, and the passage area of the third opening 62b is formed equal to or larger than the passage area of the second internal passage 62a.

Accordingly, the hydraulic oil in the internal space SS outside the transmission member 60 is caused to actively flow into the second internal passages 61e and 62a inside the transmission member 60, or the hydraulic oil in the second internal passages 61e and 62a inside the transmission member 60 is caused to actively flow into the internal space SS outside the transmission member 60, and the hydraulic oil can be circulated inside and outside the transmission member 60.

In addition, since the annular stepped part 63 of the transmission member 60 faces the annular facing part 91e of the stator 90 in the axis S direction, according to a change in the distance that separates the two, the hydraulic oil can be actively circulated in the internal space SS.

Therefore, when foreign matter is mixed in the hydraulic oil in the internal space SS, the foreign matter can be prevented from flowing into an operation region of the plunger 70 through the insertion hole 91a. Accordingly, the plunger 70 can be prevented from being worn or locked by jamming of the foreign matter.

If the foreign matter in the hydraulic oil jams around the spool 20, the jamming state can be eliminated by appropriately reciprocating the plunger 70.

According to the electromagnetic switching valve V1 having the above configuration, the facing wall 61b that faces the through passage 74 of the plunger 70 is provided as a cutoff wall inside the cylindrical transmission member 60, and the gap G defined between the insertion hole 91a of the stator 90 and the transmission member 60 is made as small as possible, and the hydraulic oil on the spool 20 side is restricted from directly flowing into the plunger 70 side.

The hydraulic oil filling around the transmission member 60 is circulated around the transmission member 60, and the hydraulic oil filling around the plunger 70 is circulated around the plunger 70, whereby the structure can be simplified without increasing the components while the foreign matter can be suppressed or prevented from entering the plunger 70 side of the electromagnetic actuator A.

Therefore, the plunger 70 can be suppressed or prevented from being worn or locked, and the electromagnetic actuator A can be normally operated.

Figure 11:
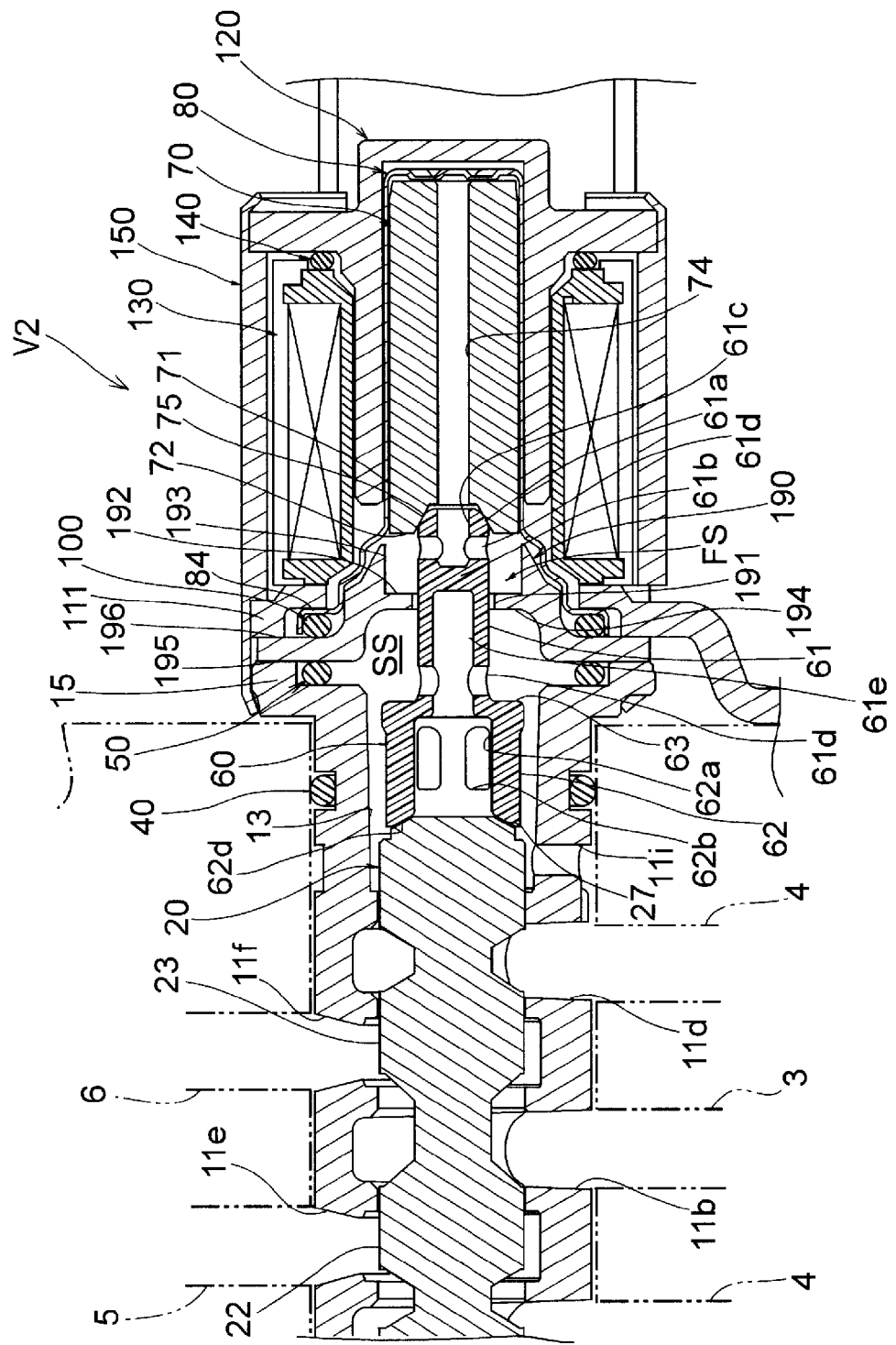
FIG. 11 is a cross-sectional view showing an electromagnetic switching valve according to a second embodiment of the disclosure.

FIG. 11 shows an electromagnetic switching valve V2 according to a second embodiment of the disclosure, which is the same as the above-described first embodiment except that the stator is changed. Therefore, the same configurations and operations are denoted by the same reference numerals and description thereof will be omitted.

The electromagnetic switching valve V2 according to the second embodiment includes the sleeve 10, the spool 20, the energizing spring 30, the seal members 40 and 50, the transmission member 60, the plunger 70, the guide sleeve 80, a stator 190, the seal member 100, the bracket 110, the inner yoke 120, the mold unit 130, the seal member 140, and the outer yoke 150.

The stator 190 includes a multistep tubular part and a disk part which are integrally formed by press-molding a metal plate made of a ferromagnetic material having a predetermined thickness, and as shown in FIG. 11, includes an insertion hole 191, an annular facing surface 192, an annular inner wall surface 193, an annular facing part 194, and joint surfaces 195 and 196.

The insertion hole 191 is for the small-diameter tubular part 61 of the transmission member 60 to be inserted therethrough with the gap G therebetween, and the hole depth thereof is shallower than the insertion hole 91a of the stator 90 according to the first embodiment. Therefore, as the hole depth becomes shallower, the area that receives the viscous resistance of the hydraulic oil also becomes smaller, and therefore the gap G can be made smaller than that of the insertion hole 91a.

The annular facing surface 192, the annular inner wall surface 193, and the joint surfaces 195 and 196 correspond to the annular facing surface 91b, the annular inner wall surface 91c, and the joint surfaces 92a and 92b of the stator 90 according to the first embodiment, respectively.

The annular facing part 194 is formed as a bottom surface of an annular recess to face the annular stepped part 63 of the transmission member 60 in the axis S direction, and the function thereof is the same as that of the annular facing part 91e of the stator 90 according to the first embodiment.

According to the electromagnetic switching valve V2 of the second embodiment, like the electromagnetic switching valve V1, the hydraulic oil filling around the transmission member 60 is circulated around the transmission member 60, and the hydraulic oil filling around the plunger 70 is circulated around the plunger 70, whereby the structure can be simplified without increasing the components while the foreign matter can be suppressed or prevented from entering the plunger 70 side of the electromagnetic actuator A.

Therefore, the plunger 70 can be suppressed or prevented from being worn or locked, and the electromagnetic actuator A can be normally operated. In particular, since the stator 190 is an integrally molded product, the manufacturing cost of components can be reduced.

Figure 12:
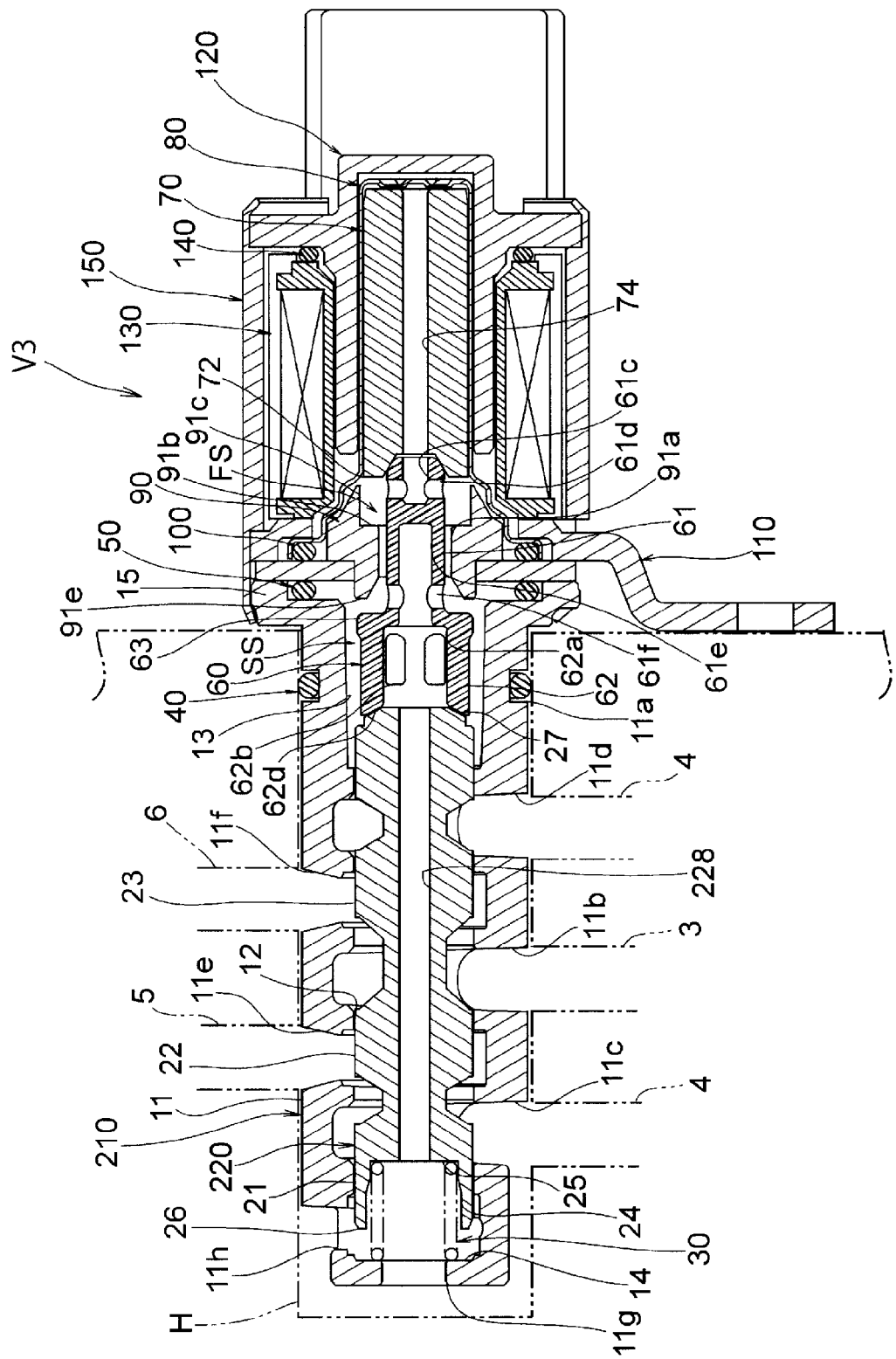
FIG. 12 is a cross-sectional view showing an electromagnetic switching valve according to a third embodiment of the disclosure.

FIG. 12 shows an electromagnetic switching valve V3 according to a third embodiment of the disclosure, which is the same as the above-described first embodiment except that that parts of the sleeve and the spool are changed. Therefore, the same configurations and operations are denoted by the same reference numerals and description thereof will be omitted.

The electromagnetic switching valve V3 according to the third embodiment includes a sleeve 210, a spool 220, the energizing spring 30, the seal members 40 and 50, the transmission member 60, the plunger 70, the guide sleeve 80, the stator 90, the seal member 100, the bracket 110, the inner yoke 120, the mold unit 130, the seal member 140, and the outer yoke 150.

The sleeve 210 is the same as that of the first embodiment except that the communication passage 11i of the sleeve 10 according to the first embodiment is omitted, and the sleeve 210 includes the outer peripheral surface 11, the seal groove 11a, the supply port 11b, the discharge ports 11c and 11d, the first port 11e, the second port 11f, the communication passages 11g and 11h, the inner peripheral surface 12, the inner peripheral surface 13, the receiving part 14, and the flange 15.

The spool 220 includes the outer peripheral surface 21, the first valve 22, the second valve 23, the recess 24, the receiving part 25, the first end 26, the second end 27, and a communication passage 228.

The communication passage 228 is formed as a cylindrical hole centered on the axis S and penetrating in the axis S direction, allows the second internal passages 62a and 61e of the transmission member 60 to communicate with the communication passage 11g and the discharge oil passage 4, and allows the flow of the hydraulic oil.

The communication passage 228 has the same function as the communication passage 11i of the sleeve 10 according to the first embodiment, and assists the circulating flow of the hydraulic oil in the internal space SS inside and outside the transmission member 60 as the transmission member 60 reciprocally moves.

According to the electromagnetic switching valve V3 having the above configuration, like the electromagnetic switching valves V1 and V2, the hydraulic oil filling around the transmission member 60 is circulated around the transmission member 60, and the hydraulic oil filling around the plunger 70 is circulated around the plunger 70, whereby the structure can be simplified without increasing the components while the foreign matter can be suppressed or prevented from entering the plunger 70 side of the electromagnetic actuator A.

Therefore, the plunger 70 can be suppressed or prevented from being worn or locked, and the electromagnetic actuator A can be normally operated.

Figure 13:
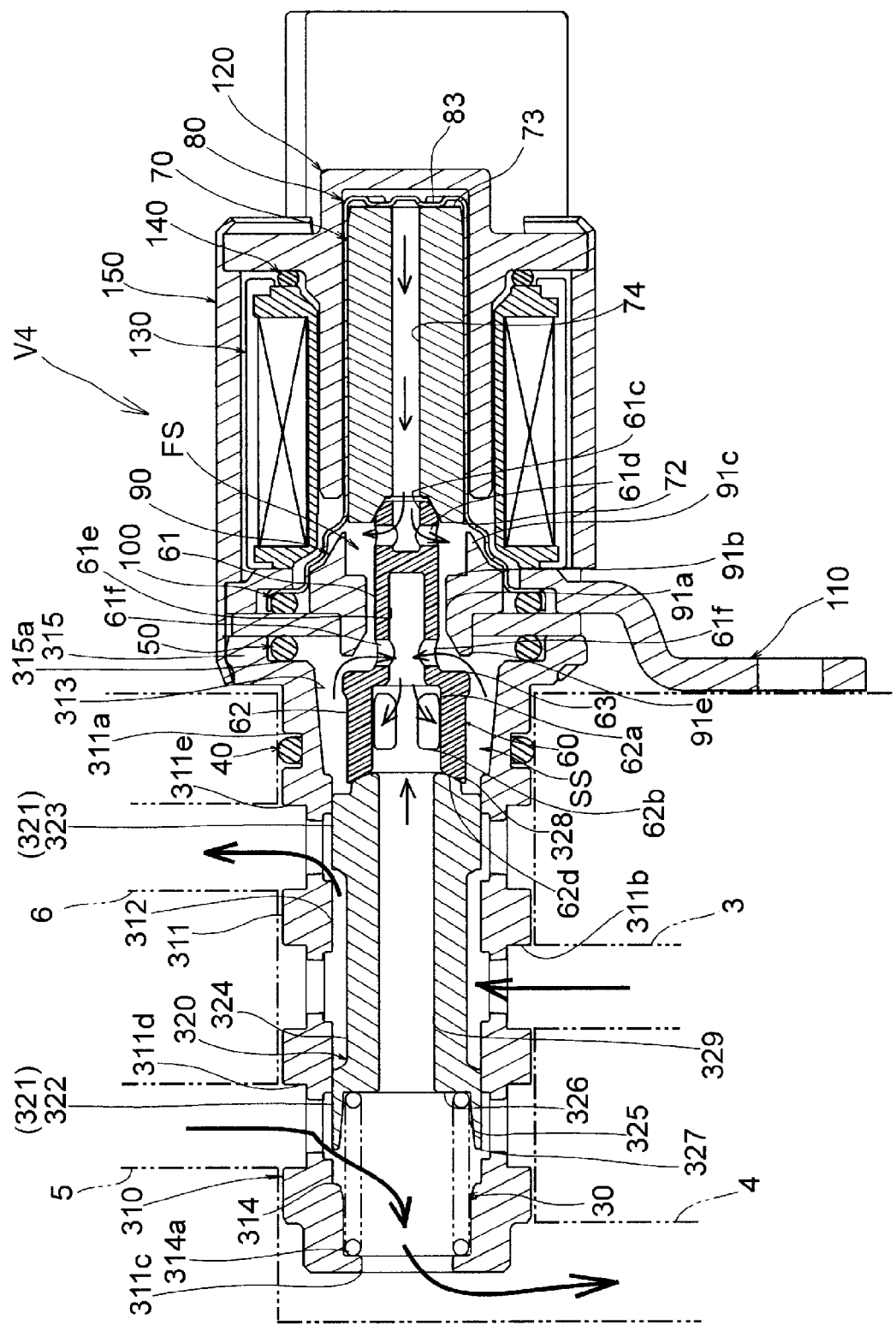
FIG. 13 is a cross-sectional view showing an electromagnetic switching valve according to a fourth embodiment of the disclosure, showing a state in which the plunger is located in a rest position.
Figure 14:
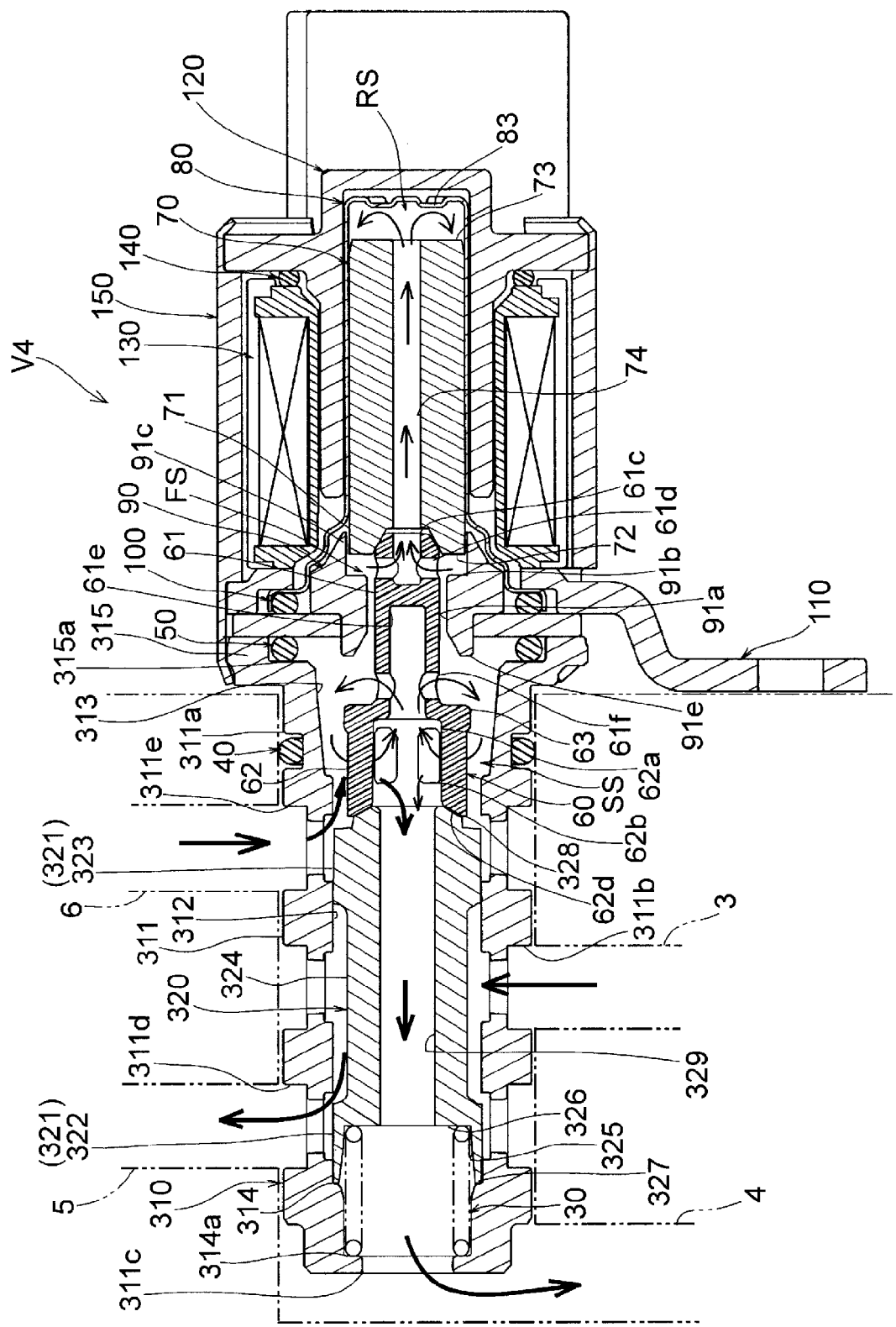
FIG. 14 is a cross-sectional view showing the electromagnetic switching valve according to the fourth embodiment of the disclosure, showing a state in which the plunger advances and is located in a maximum movement position.

FIG. 13 and FIG. 14 show an electromagnetic switching valve V4 according to a fourth embodiment of the disclosure, which is the same as the above-described first embodiment except that that parts of the sleeve and the spool are changed. Therefore, the same configurations and operations are denoted by the same reference numerals and description thereof will be omitted.

The electromagnetic switching valve V4 according to the fourth embodiment includes a sleeve 310, a spool 320, the energizing spring 30, the seal members 40 and 50, the transmission member 60, the plunger 70, the guide sleeve 80, the stator 90, the seal member 100, the bracket 110, the inner yoke 120, the mold unit 130, the seal member 140, and the outer yoke 150.

The sleeve 310 is formed of a metal material such as aluminum or the like into a cylindrical shape centered on the axis S, and includes an outer peripheral surface 311, a seal groove 311a, a supply port 311b, a discharge port 311c, a first port 311d, a second port 311e, an inner peripheral surface 312, an inner peripheral surface 313, receiving parts 314 and 314a, and a flange 315.

The outer peripheral surface 311 is formed as a cylindrical surface centered on the axis S, and is fitted in the fitting hole H of the engine body EB.

The seal groove 311a is formed as an annular groove on the outer peripheral surface 311 for the seal member 40 to be fitted therein.

The supply port 311b communicates with the supply oil passage 3. The discharge port 311c communicates with the discharge oil passage 4. The first port 311d communicates with the first oil passage 5. The second port 311e communicates with the second oil passage 6.

The inner peripheral surface 312 is formed as a cylindrical surface centered on the axis S, and makes close contact with and slidably guides the outer peripheral surface 321 of the spool 320.

The inner peripheral surface 313 is formed as a conical surface centered on the axis S, having a larger inner diameter than the inner peripheral surface 312 and widened at an end toward the flange 315, and is formed so that the internal space SS is secured around the transmission member 60 in the state in which the transmission member 60 is disposed.

The receiving part 314 serves to receive a first end 327 of the spool 320 and stop the spool 320 in the maximum advance position. The receiving part 314a serves to receive one end of the energizing spring 30.

The flange 315 is joined to the stator 90 with an end of the outer yoke 150 being crimped, and is connected and fixed to the electromagnetic actuator A. In addition, in the flange 315, an annular recess 315a is provided housing the seal member 50 so as to sandwich the seal member 50 in cooperation with the stator 90.

The spool 320 is formed so as to extend in the axis S direction, and includes the outer peripheral surface 321, a first valve 322, a second valve 323, a small diameter part 324, a recess 325, a receiving part 326, the first end 327, a second end 328, and a communication passage 329.

To slide on the inner peripheral surface 312 of the sleeve 310, the outer peripheral surface 321 is formed in a cylindrical shape centered on the axis S, and has an outer diameter substantially the same as or slightly smaller than the inner diameter of the inner peripheral surface 312.

The first valve 322 is formed so as to define the outer peripheral surface 321 that is wider than an opening width of the first port 311d in the axis S direction, and opens and closes the first port 311d of the sleeve 310 by moving in the axis S direction.

The second valve 323 is formed so as to define the outer peripheral surface 321 that is wider than an opening width of the second port 311e in the axis S direction, and opens and closes the second port 311e of the sleeve 310 by moving in the axis S direction.

The small diameter part 324 is formed between the first valve part 322 and the second valve part 323, and defines a space that allows the flow of the hydraulic oil in cooperation with the inner peripheral surface 312 of the sleeve 310.

The recess 325 is formed on the first end 327 side so as to house the energizing spring 30 in an extensible and compressible manner.

The receiving part 326 is formed as a bottom wall of the recess 325 to receive the other end of the energizing spring 30 housed in the recess 325.

The first end 327 is formed as an annular end surface and releasably abuts against the receiving part 314 of the sleeve 310.

The second end 328 is formed as an annular and convex curved surface centered on the axis S to abut against the annular abutting part 62d of the transmission member 60 in the axis S direction.

The communication passage 329 is formed as a cylindrical hole penetrating in the axis S direction, and allows the second internal passages 62a and 61e of the transmission member 60 to communicate with the discharge port 311c.

Next, a switching operation of the electromagnetic switching valve V4 is described.

First, in a non-energized state of the coil 132, by the energizing force of the energizing spring 30 via the spool 320 and the transmission member 60, the plunger 70 stops in the rest position where the second end 73 abuts against the stopper 83, as shown in FIG. 13.

In addition, the spool 320 stops in a retreat position corresponding to the rest position of the plunger 70 via the transmission member 60.

In this retreat position, the first valve 322 of the spool 320 is in a state of closing an oil passage between the first port 311d and the supply port 311b and opening an oil passage between the first port 311d and the discharge port 311c.

In addition, the second valve 323 of the spool 320 is in a state of opening an oil passage between the second port 311e and the supply port 311b and closing an oil passage between the second port 311e and the discharge port 311c.

At this time, the hydraulic oil is discharged through the first oil passage 5 and supplied through the second oil passage 6.

Subsequently, when the coil 132 is appropriately energized and the magnetomotive force is generated, the plunger 70 advances while resisting the energizing force of the energizing spring 30. As shown in FIG. 14, the first end 327 abuts against the receiving part 314, and the spool 320 is positioned in the maximum advance position.

In this maximum advance position, the first valve 322 of the spool 320 is in a state of opening the oil passage between the first port 311d and the supply port 311b and closing the oil passage between the first port 311d and the discharge port 311c.

In addition, the second valve 323 of the spool 320 is in a state of closing the oil passage between the second port 311e and the supply port 311b and opening the oil passage between the second port 311e and the discharge port 311c via the internal space SS, the third opening 62b and the second opening 61f, the second internal passages 62a and 61e, and the communication passage 329.

At this time, the hydraulic oil is supplied through the first oil passage 5 and discharged through the second oil passage 6.

Moreover, the energization of the coil 132 can be appropriately controlled and the spool 320 can be stopped in an intermediate position.

In this intermediate position, the first valve 322 of the spool 320 is in a state of closing the oil passage between the first port 311d and the supply port 311b and closing the oil passage between the first port 311d and the discharge port 311c.

In addition, the second valve 323 of the spool 320 is in a state of closing the oil passage between the second port 311e and the supply port 311b and closing the oil passage between the second port 311e and the discharge port 311c.

At this time, the supply and discharge of hydraulic oil are cut off in both the first oil passage 5 and the second oil passage 6.

The operation when the electromagnetic switching valve V4 performing the above switching operation is applied to, for example, the valve timing changing device M of the camshaft CS on the intake side of the internal combustion engine and the operation when applied to the valve timing changing device M of the camshaft CS on the exhaust side of the internal combustion engine are the same as those of the electromagnetic switching valve V1 according to the first embodiment as described above.

Next, the flow of the hydraulic oil around the plunger 70 and the transmission member 60 in the electromagnetic switching valve V4 performing the above switching operation is described.

When the plunger 70 advances from the rest position, as shown in FIG. 14, the hydraulic oil in the advance movement space FS passes through the through passage 74 of the plunger 70 via the first opening 61d and the first internal passage 61c of the transmission member 60, and flows into the retreat movement space RS defined behind the plunger 70, as shown by arrows. Accordingly, the plunger 70 is able to smoothly advance.

Here as well, like the above-described first embodiment, since the passage area of the first internal passage 61c is formed equal to or larger than the passage area of the through passage 74, and the passage area of the first opening 61d is formed equal to or larger than the passage area of the first internal passage 61c, when the hydraulic oil moves from the advance movement space FS to the retreat movement space RS, a dampering effect or the like caused by throttling resistance can be prevented from occurring and the plunger 70 can be smoothly operated.

Further, as the plunger 70 advances, the outer peripheral surface 71 of the plunger 70 faces the annular inner wall surface 91c of the stator 90 in the radial direction with a small gap, and the first end 72 of the plunger 70 faces the annular facing surface 91b of the stator 90 in the axis S direction. Therefore, the hydraulic oil in the advance movement space FS surrounded by the first end 72 and the annular facing surface 91b is actively directed to the first opening 61d and the first internal passage 61c, and the flow of the hydraulic oil from the advance movement space FS to the retreat movement space RS is facilitated.

On the other hand, in the internal space SS of the sleeve 310, the transmission member 60 is pushed by the plunger 70 and advances together with the spool 320.

Here, the passage area of the gap G defined around the small-diameter tubular part 61 of the transmission member 60 in the insertion hole 91a of the stator 90 is equal to or smaller than the passage area of the first opening 61d, that is, the passage area of the gap G is formed as small as possible within the range in which the viscous resistance does not increase. Therefore, it becomes difficult for the hydraulic oil (in particular foreign matter) in the internal space SS to flow into the advance movement space FS through the insertion hole 91a.

In this state, in the hydraulic oil in the internal space SS, because the annular stepped part 63 and the annular facing part 91e are separated by an increasing distance, for example, as shown by the arrows in FIG. 14, the hydraulic oil in the second internal passage 61e of the transmission member 60 flows from the second opening 61f into the internal space SS, and the hydraulic oil in the internal space SS outside the transmission member 60 flows from the third opening 62b into the second internal passages 62a and 61e, or flows from the communication passage 329 toward the discharge port 311c along with the flow of the hydraulic oil flowing from the second port 311e into the internal space SS. In this way, the hydraulic oil in the internal space SS circulates around the transmission member 60 on the whole and flows from the communication passage 329 toward the discharge port 311c.

When the plunger 70 retreats toward the rest position from the advance position, as shown by arrows in FIG. 13, the hydraulic oil in the retreat movement space RS passes through the first passage 61c and the first opening 61d of the transmission member 60 via the through passage 74 of the plunger 70, and flows into the advance movement space FS defined on a front side of the plunger 70. Accordingly, the plunger 70 is able to smoothly retreat.

Here, as described above, since the passage area of the first internal passage 61c is formed equal to or larger than the passage area of the through passage 74, and the passage area of the first opening 61d is formed equal to or larger than the passage area of the first internal passage 61c, when the hydraulic oil moves from the retreat movement space RS to the advance movement space FS, a dampering effect or the like caused by throttling resistance can be prevented from occurring and the plunger 70 can be smoothly operated.

On the other hand, in the internal space SS of the sleeve 310, due to the energizing force of the energizing spring 30, the transmission member 60 retreats together with the spool 320, following the plunger 70.

Here, similarly to the above, the passage area of the gap G defined around the small-diameter tubular part 61 of the transmission member 60 in the insertion hole 91a of the stator 90 is equal to or smaller than the passage area of the first opening 61d, that is, the passage area of the gap G is formed as small as possible within the range in which the viscous resistance does not increase. Therefore, it becomes difficult for the hydraulic oil (in particular foreign matter) in the internal space SS to flow into the advance movement space FS through the insertion hole 91a.

In this state, in the hydraulic oil in the internal space SS, because the annular stepped part 63 and the annular facing part 91e are separated by a decreasing distance, for example, as shown by the arrows in FIG. 13, the hydraulic oil in the internal space SS outside the transmission member 60 flows from the second opening 61f of the transmission member 60 into the second internal passage 61e, and the hydraulic oil in the second internal passages 62a and 61e of the transmission member 60 flows from the third opening 62b into the internal space SS outside the transmission member 60, or the hydraulic oil in the communication passage 329 leading to the discharge port 311c flows toward the second internal passages 62a and 61e. In this way, the hydraulic oil in the internal space SS circulates around the transmission member 60 on the whole.

Here, as described above, the second opening 61f and the third opening 62b are formed separated from each other in the axis S direction, and the passage area of the second opening 61f is formed equal to or larger than the passage area of the second internal passage 61e, and the passage area of the third opening 62b is formed equal to or larger than the passage area of the second internal passage 62a.

Accordingly, the hydraulic oil in the internal space SS outside the transmission member 60 is caused to actively flow into the second internal passages 61e and 62a inside the transmission member 60, or the hydraulic oil in the second internal passages 61e and 62a inside the transmission member 60 is caused to actively flow into the internal space SS outside the transmission member 60, and the hydraulic oil can be circulated inside and outside the transmission member 60.

In addition, since the annular stepped part 63 of the transmission member 60 faces the annular facing part 91e of the stator 90 in the axis S direction, according to a change in the distance that separates the two, the hydraulic oil can be actively circulated in the internal space SS.

Therefore, when foreign matter is mixed in the hydraulic oil in the internal space SS, the foreign matter can be prevented from flowing into an operation region of the plunger 70 through the insertion hole 91a. Accordingly, the plunger 70 can be prevented from being worn or locked by jamming of the foreign matter.

If the foreign matter in the hydraulic oil jams around the spool 320, the jamming state can be eliminated by appropriately reciprocating the plunger 70.

According to the electromagnetic switching valve V4 having the above configuration, the facing wall 61b that faces the through passage 74 of the plunger 70 is provided as a cutoff wall inside the cylindrical transmission member 60, and the gap G defined between the insertion hole 91a of the stator 90 and the transmission member 60 is made as small as possible, and the hydraulic oil on the spool 320 side is restricted from directly flowing into the plunger 70 side.

The hydraulic oil filling around the transmission member 60 is circulated around the transmission member 60, and the hydraulic oil filling around the plunger 70 is circulated around the plunger 70, whereby the structure can be simplified without increasing the components while the foreign matter can be suppressed or prevented from entering the plunger 70 side of the electromagnetic actuator A.

Therefore, the plunger 70 can be suppressed or prevented from being worn or locked, and the electromagnetic actuator A can be normally operated.

In particular, since the spool 320 is configured to have two land parts (the first valve 322 and the second valve 323) on two end sides, the total length can be shortened, and the electromagnetic switching valve V4 can be reduced in size as a whole.

Although the transmission member 60 having the small-diameter tubular part 61 and the large-diameter tubular part 62 is shown as the transmission member in the above embodiments, the disclosure is not limited thereto, and a tubular member having a single outer diameter may be adopted as the transmission member.

Although the transmission member 60 formed of a resin material is shown as the transmission member in the above embodiments, the disclosure is not limited thereto, and a transmission member formed of other nonmagnetic material may be adopted.

Although in the transmission member 60, the second opening 61$f$ and the third opening 62$b$ disposed separated from each other in the axis S direction are shown as the second opening and the third opening of the transmission member in the above embodiments, the disclosure is not limited thereto, and a single second opening having a large opening area may be adopted.

Although the transmission member 60 formed as a separate component that can be detached from the spools 20, 220 and 320 is shown in the above embodiments, the disclosure is not limited thereto, and it may be configured that the transmission member is fixed to the spool or that the transmission member is integrally formed with the spool.

Although cases where the electromagnetic switching valves V1, V2, V3 and V4 are fitted into the fitting hole H of the engine body EB are shown in the above embodiments, the disclosure is not limited thereto, and the electromagnetic switching valves V1, V2, V3 and V4 may be mounted in other places.

In the above electromagnetic switching valve, a configuration may be adopted in which the transmission member comprises a third opening formed to be separated from the second opening in the axis direction.

In the above electromagnetic switching valve, a configuration may be adopted in which a passage area of the first internal passage is equal to or larger than a passage area of the through passage.

In the above electromagnetic switching valve, a configuration may be adopted in which a passage area of the first opening is equal to or larger than a passage area of the first internal passage.

In the above electromagnetic switching valve, a configuration may be adopted in which a passage area of a gap defined around the transmission member in the insertion hole is equal to or smaller than a passage area of the first opening.

In the above electromagnetic switching valve, a configuration may be adopted in which a passage area of the second opening is equal to or larger than a passage area of the second internal passage.

In the above electromagnetic switching valve, a configuration may be adopted in which the transmission member includes a large-diameter tubular part disposed in the sleeve, and a small-diameter tubular part inserted through the insertion hole of the stator, wherein the small-diameter tubular part includes the facing wall, the first internal passage, the first opening, the second internal passage, and the second opening, and the large-diameter tubular part includes the second internal passage and a third opening.

In the above electromagnetic switching valve, a configuration may be adopted in which the transmission member includes an annular stepped part formed at a boundary between the small-diameter tubular part and the large-diameter tubular part, and the stator includes an annular facing part facing the annular stepped part in the axis direction.

In the above electromagnetic switching valve, a configuration may be adopted in which the transmission member includes an annular abutting part defining an opening that opens the second internal passage toward the spool and abutting against the spool.

In the above electromagnetic switching valve, a configuration may be adopted in which the stator includes: an annular facing surface facing the plunger in the axis direction; and an annular inner wall surface capable of facing an outer peripheral surface of the plunger.

In the above electromagnetic switching valve, a configuration may be adopted in which the plunger includes a receiving recess around the through passage to receive and abut against an end of the transmission member.

In the above electromagnetic switching valve, a configuration may be adopted in which the sleeve includes a communication passage which provides communication between an internal space where the transmission member is disposed and the oil passage.

In the above electromagnetic switching valve, a configuration may be adopted in which the spool includes a communication passage which provides communication between the second internal passage of the transmission member and the oil passage.

In the above electromagnetic switching valve, a configuration may be adopted in which the transmission member is formed of a resin material.

According to the electromagnetic switching valve having the above configuration, the structure can be simplified without increasing the number of components while the foreign matter can be suppressed or prevented from entering the plunger side of the electromagnetic actuator.

INDUSTRIAL APPLICABILITY

As described above, according to the electromagnetic switching valve of the disclosure, the structure can be simplified without increasing the number of components while the foreign matter can be suppressed or prevented from entering the plunger side of the electromagnetic actuator. Therefore, it is needless to say that the disclosure can be applied to an engine mounted on an automobile or the like, the disclosure is also useful in an engine mounted on other vehicles such as a two-wheeler or the like, and the disclosure is also useful in controlling the flow of hydraulic oil in other hydraulic equipment.

What is claimed is:
1. An electromagnetic switching valve comprising:
   a sleeve, defining a port communicating with an oil passage supplying or discharging hydraulic oil;
   a spool, reciprocally movably disposed on a predetermined axis direction in the sleeve, opening and closing the port;

an electromagnetic actuator, comprising a plunger having a through passage which extends in the axis direction and a stator exerting a magnetomotive force on the plunger; and a transmission member of a tubular shape, interposed between the plunger and the spool and transmitting a driving force, wherein the stator comprises an insertion hole through which the transmission member is inserted, and the transmission member comprises:

a facing wall facing the through passage of the plunger;

a first internal passage formed closer to the plunger than the facing wall and communicating with the through passage;

a first opening formed closer to the plunger than the insertion hole and opening the first internal passage in a radial direction;

a second internal passage formed closer to the spool than the facing wall; and a second opening formed closer to the spool than the insertion hole and opening the second internal passage in the radial direction.

2. The electromagnetic switching valve according to claim 1, wherein the transmission member comprises a third opening formed to be separated from the second opening in the axis direction.

3. The electromagnetic switching valve according to claim 1, wherein a passage area of the first internal passage is equal to or larger than a passage area of the through passage.

4. The electromagnetic switching valve according to claim 1, wherein a passage area of the first opening is equal to or larger than a passage area of the first internal passage.

5. The electromagnetic switching valve according to claim 1, wherein a passage area of a gap defined around the transmission member in the insertion hole is equal to or smaller than a passage area of the first opening.

6. The electromagnetic switching valve according to claim 1, wherein a passage area of the second opening is equal to or larger than a passage area of the second internal passage.

7. The electromagnetic switching valve according to claim 1, wherein the transmission member comprises a large-diameter tubular part disposed in the sleeve, and a small-diameter tubular part inserted through the insertion hole of the stator, wherein the small-diameter tubular part comprises the facing wall, the first internal passage, the first opening, the second internal passage, and the second opening, and the large-diameter tubular part comprises the second internal passage and a third opening.

8. The electromagnetic switching valve according to claim 7, wherein the transmission member comprises an annular stepped part formed at a boundary between the small-diameter tubular part and the large-diameter tubular part, and the stator comprises an annular facing part facing the annular stepped part in the axis direction.

9. The electromagnetic switching valve according to claim 1, wherein the transmission member comprises an annular abutting part defining an opening that opens the second internal passage toward the spool and abutting against the spool.

10. The electromagnetic switching valve according to claim 1, wherein the stator comprises:

an annular facing surface facing the plunger in the axis direction; and an annular inner wall surface capable of facing an outer peripheral surface of the plunger.

11. The electromagnetic switching valve according to claim 1, wherein the plunger comprises a receiving recess around the through passage to receive and abut against an end of the transmission member.

12. The electromagnetic switching valve according to claim 1, wherein the sleeve comprises a communication passage which provides communication between an internal space where the transmission member is disposed and the oil passage.

13. The electromagnetic switching valve according to claim 1, wherein the spool comprises a communication passage which provides communication between the second internal passage of the transmission member and the oil passage.

14. The electromagnetic switching valve according to claim 1, wherein the transmission member is formed of a resin material.

* * * * *